United States Patent
Sawada

(10) Patent No.: US 8,811,746 B2
(45) Date of Patent: Aug. 19, 2014

(54) MOBILE UNIT POSITION DETECTING APPARATUS AND MOBILE UNIT POSITION DETECTING METHOD

(75) Inventor: Kensuke Sawada, Kawasaki (JP)

(73) Assignee: Fujitsu Limited, Kawasaki-Shi (JP)

( * ) Notice: Subject to any disclaimer, the term of this patent is extended or adjusted under 35 U.S.C. 154(b) by 148 days.

(21) Appl. No.: 13/351,609

(22) Filed: Jan. 17, 2012

(65) Prior Publication Data

US 2012/0189162 A1 Jul. 26, 2012

Related U.S. Application Data

(63) Continuation of application No. PCT/JP2009/003667, filed on Jul. 31, 2009.

(51) Int. Cl.
*G06K 9/00* (2006.01)

(52) U.S. Cl.
USPC .......................................................... 382/191

(58) Field of Classification Search
None
See application file for complete search history.

(56) References Cited

U.S. PATENT DOCUMENTS

| | | | | | |
|---|---|---|---|---|---|
| 5,008,946 | A | * | 4/1991 | Ando | 382/104 |
| 5,929,784 | A | * | 7/1999 | Kawaziri et al. | 340/903 |
| 7,068,154 | B2 | * | 6/2006 | Kudo | 340/436 |
| 7,672,510 | B2 | * | 3/2010 | Nagaoka et al. | 382/170 |
| 2001/0036293 | A1 | * | 11/2001 | Laumeyer et al. | 382/104 |
| 2002/0051578 | A1 | * | 5/2002 | Imagawa et al. | 382/224 |
| 2005/0036660 | A1 | * | 2/2005 | Otsuka et al. | 382/104 |
| 2005/0111698 | A1 | * | 5/2005 | Kawai | 382/103 |
| 2006/0233424 | A1 | * | 10/2006 | Miyajima et al. | 382/104 |
| 2010/0328316 | A1 | * | 12/2010 | Stroila et al. | 345/441 |

FOREIGN PATENT DOCUMENTS

| | | |
|---|---|---|
| JP | 7-6900 | 1/1995 |
| JP | 08-219775 | 8/1996 |
| JP | 11-271074 | 10/1999 |
| JP | 2000-194831 | 7/2000 |
| JP | 2001-118187 | 4/2001 |
| JP | 2001-142532 | 5/2001 |
| JP | 2001-330411 | 11/2001 |
| JP | 2003-085535 | 3/2003 |
| JP | 2006-053775 | 2/2006 |
| JP | 2007-004256 | 1/2007 |
| JP | 2007-172483 | 7/2007 |
| JP | 2009-014645 | 1/2009 |
| JP | 2009-037375 | 2/2009 |

OTHER PUBLICATIONS

International Search Report for PCT/JP2009/003667, mailed Nov. 2, 2009.

(Continued)

*Primary Examiner* — Barry Drennan
*Assistant Examiner* — Oneal R Mistry
(74) *Attorney, Agent, or Firm* — Staas & Halsey LLP

(57) ABSTRACT

The mobile unit position detecting apparatus generates target data by extracting a target from an image shot by the image capturing device, extracts target setting data that best matches the target data, is prerecorded in a recording unit and is shot for each target, obtains a target ID corresponding to the extracted target setting data from the recording unit, detects position data associated with the obtained target ID, tracks the target in the image shot by the image capturing device, and calculates an aspect ratio of the target being tracked in the image. If the aspect ratio is equal to or lower than a threshold value, the mobile unit position detecting apparatus outputs the detected position data.

10 Claims, 32 Drawing Sheets

(56) References Cited

OTHER PUBLICATIONS

Partial English Translation of Japanese Reference 11-271074 issued Oct. 5, 1999.
Partial English Translation of Japanese Reference 2009-14645 issued Jan. 22, 2009.
English Translation of the Written Opinion of the International Searching Authority mailed Nov. 2, 2009 issued in corresponding International Patent Application No. PCT/JP2009/003667.
International Preliminary Report on Patentability mailed Feb. 9, 2012 (English Translation mailed Feb. 18, 2012) issued in corresponding International Patent Application No. PCT/JP2009/003667.
Hiroyuki Uchiyama et al., "Ego-localization using Streetscape Image Sequences from In-vehicle Cameras", Intelligent Vehicles Symposium, 2009 IEEE, pp. 185-190.
Japanese Office Action mailed Mar. 19, 2013 for corresponding Japanese Application No. 2011-524549.

* cited by examiner

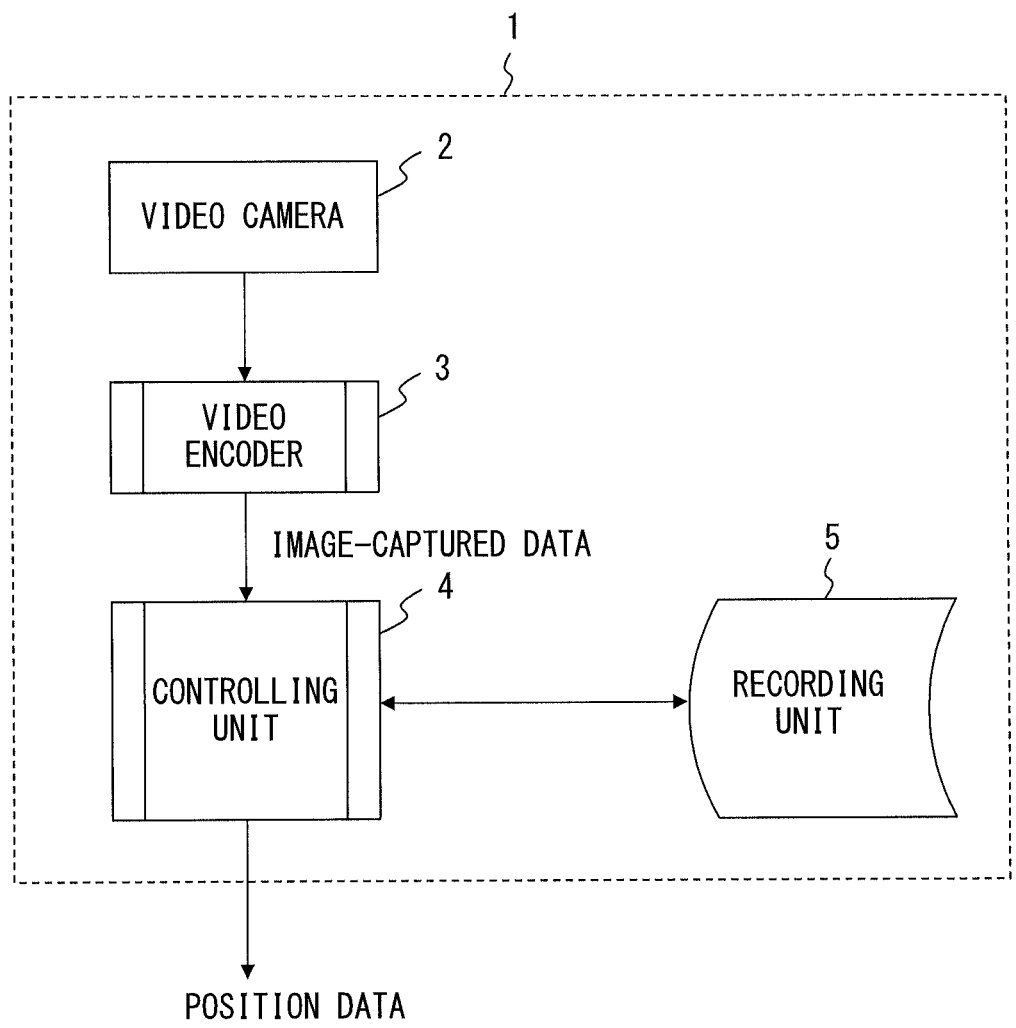
F I G. 2

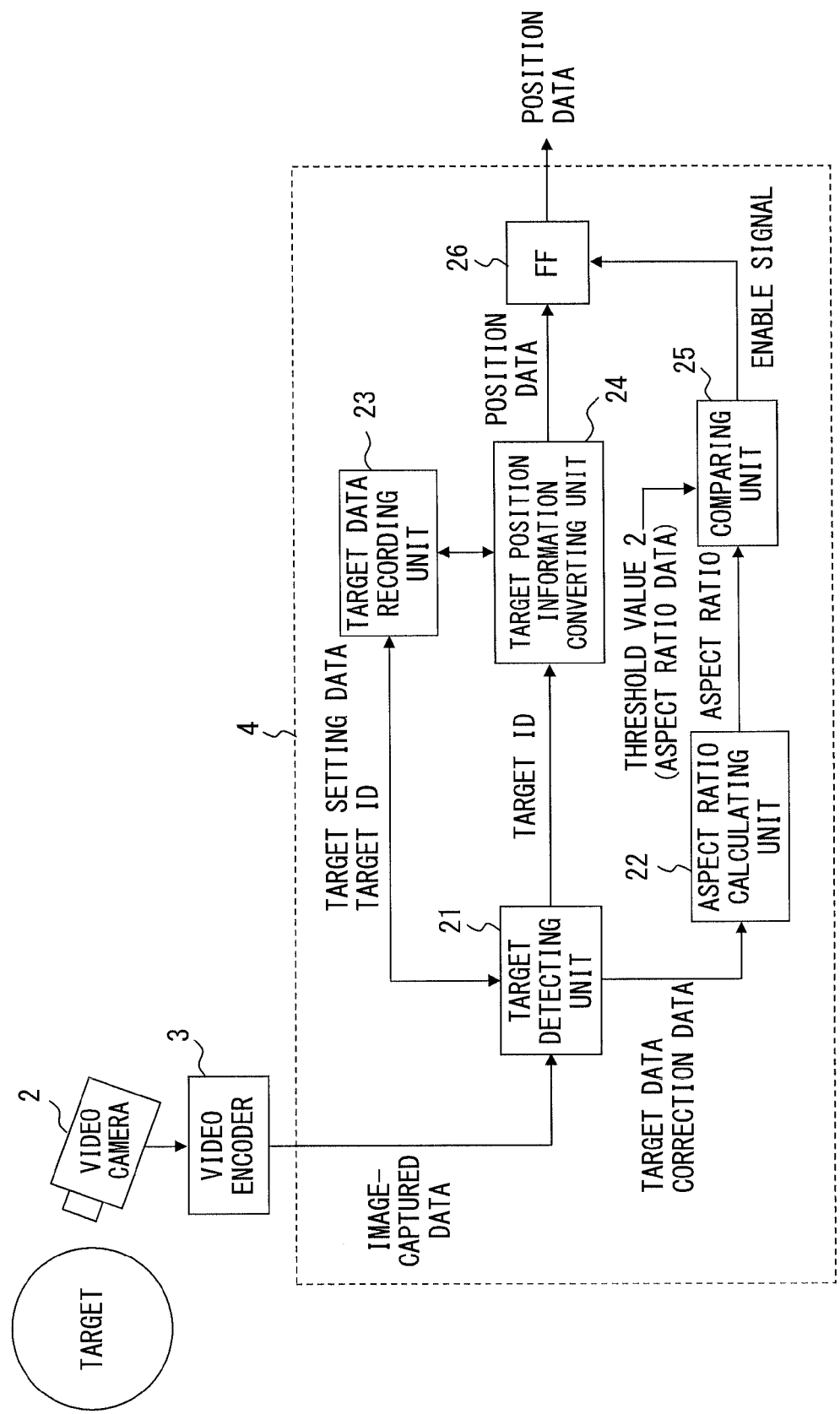
F I G. 3

| TARGET ID | TARGET SETTING DATA | | | | | | THRESHOLD VALUE 2 (ASPECT RATIO DATA) | POSITION DATA |
|---|---|---|---|---|---|---|---|---|
| | IMAGE DATA | OUTLINE DATA | COLOR DATA | PATTERN DATA | CHARACTER DATA | | | |
| 1 | IMAGE 1 | OUTLINE 1 | COLOR 1 | PATTERN 1 | CHARACTER 1 | | RATIO 1 | POSITION DATA 1 |
| 2 | IMAGE 2 | OUTLINE 2 | COLOR 2 | PATTERN 2 | CHARACTER 2 | | RATIO 2 | POSITION DATA 2 |
| 3 | IMAGE 3 | OUTLINE 3 | COLOR 3 | PATTERN 3 | CHARACTER 3 | | RATIO 3 | POSITION DATA 3 |
| 4 | IMAGE 4 | OUTLINE 4 | COLOR 4 | PATTERN 4 | CHARACTER 4 | | RATIO 4 | POSITION DATA 4 |
| 5 | IMAGE 5 | OUTLINE 5 | COLOR 5 | PATTERN 5 | CHARACTER 5 | | RATIO 5 | POSITION DATA 5 |
| 6 | IMAGE 6 | OUTLINE 6 | COLOR 6 | PATTERN 6 | CHARACTER 6 | | RATIO 6 | POSITION DATA 6 |
| 7 | IMAGE 7 | OUTLINE 7 | COLOR 7 | PATTERN 7 | CHARACTER 7 | | RATIO 7 | POSITION DATA 7 |
| 8 | IMAGE 8 | OUTLINE 8 | COLOR 8 | PATTERN 8 | CHARACTER 8 | | RATIO 8 | POSITION DATA 8 |
| 9 | IMAGE 9 | OUTLINE 9 | COLOR 9 | PATTERN 9 | CHARACTER 9 | | RATIO 9 | POSITION DATA 9 |
| 10 | IMAGE 10 | OUTLINE 10 | COLOR 10 | PATTERN 10 | CHARACTER 10 | | RATIO 10 | POSITION DATA 10 |
| 11 | IMAGE 11 | OUTLINE 11 | COLOR 11 | PATTERN 11 | CHARACTER 11 | | RATIO 11 | POSITION DATA 11 |
| 12 | IMAGE 12 | OUTLINE 12 | COLOR 12 | PATTERN 12 | CHARACTER 12 | | RATIO 12 | POSITION DATA 12 |
| 13 | IMAGE 13 | OUTLINE 13 | COLOR 13 | PATTERN 13 | CHARACTER 13 | | RATIO 13 | POSITION DATA 13 |
| 14 | IMAGE 14 | OUTLINE 14 | COLOR 14 | PATTERN 14 | CHARACTER 14 | | RATIO 14 | POSITION DATA 14 |
| 15 | IMAGE 15 | OUTLINE 15 | COLOR 15 | PATTERN 15 | CHARACTER 15 | | RATIO 15 | POSITION DATA 15 |
| ......... | ......... | ......... | ......... | ......... | ......... | | ......... | ......... |
| N-1 | IMAGE n-1 | OUTLINE n-1 | COLOR n-1 | PATTERN n-1 | CHARACTER n-1 | | RATIO n-1 | POSITION DATA n-1 |
| N | IMAGE n | OUTLINE n | COLOR n | PATTERN n | CHARACTER n | | RATIO n | POSITION DATA n |

COUNT VALUE ↑

F I G. 4

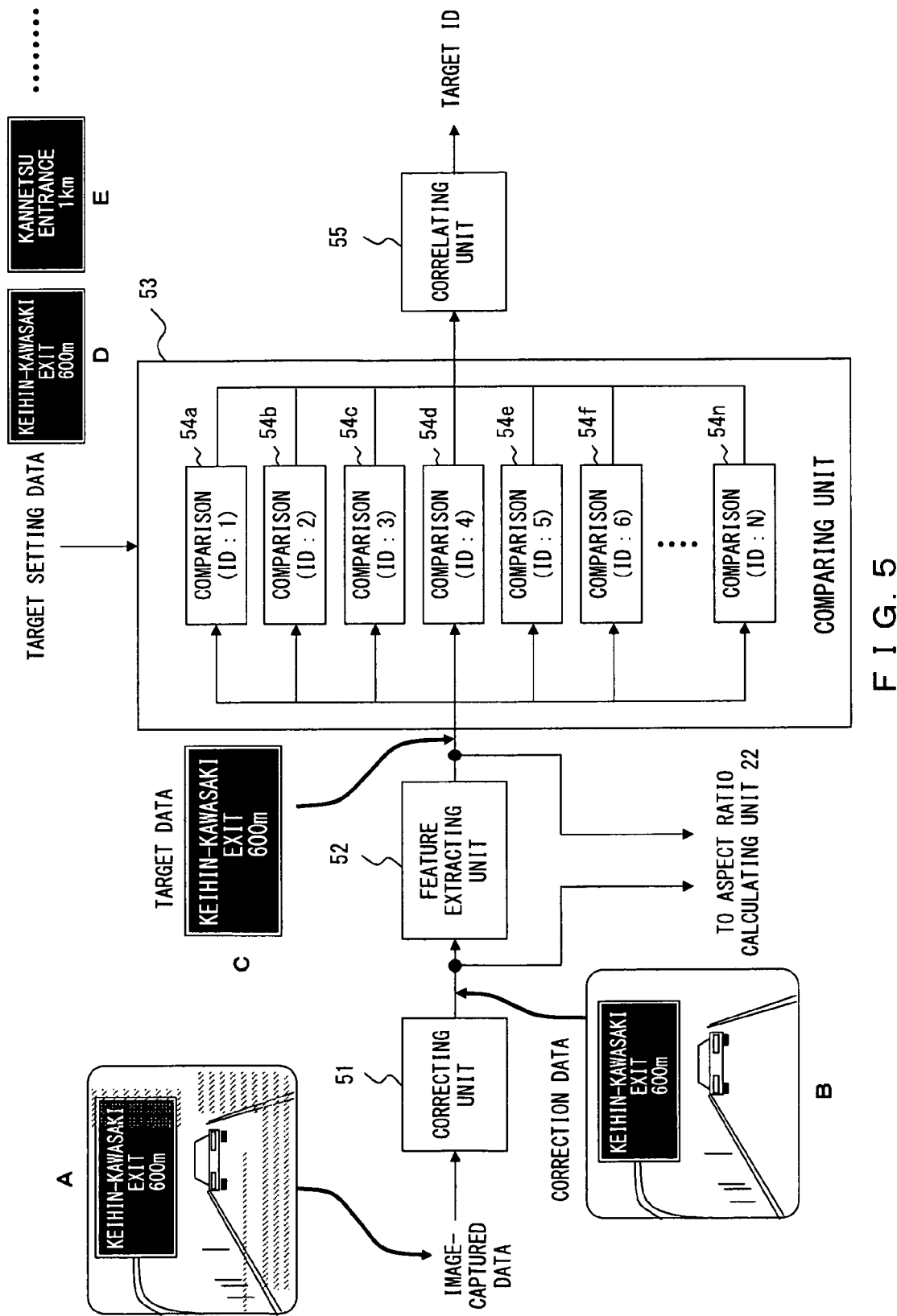
F I G. 5

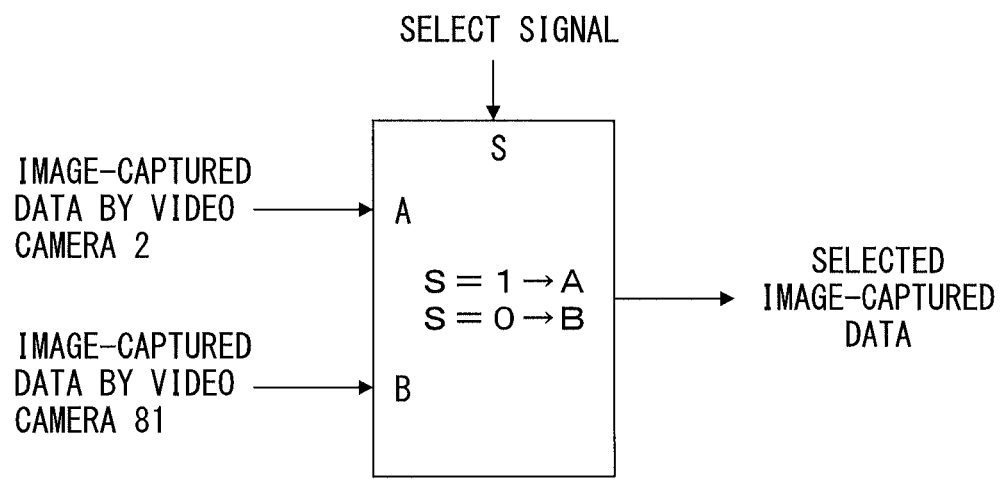
F I G. 1 0

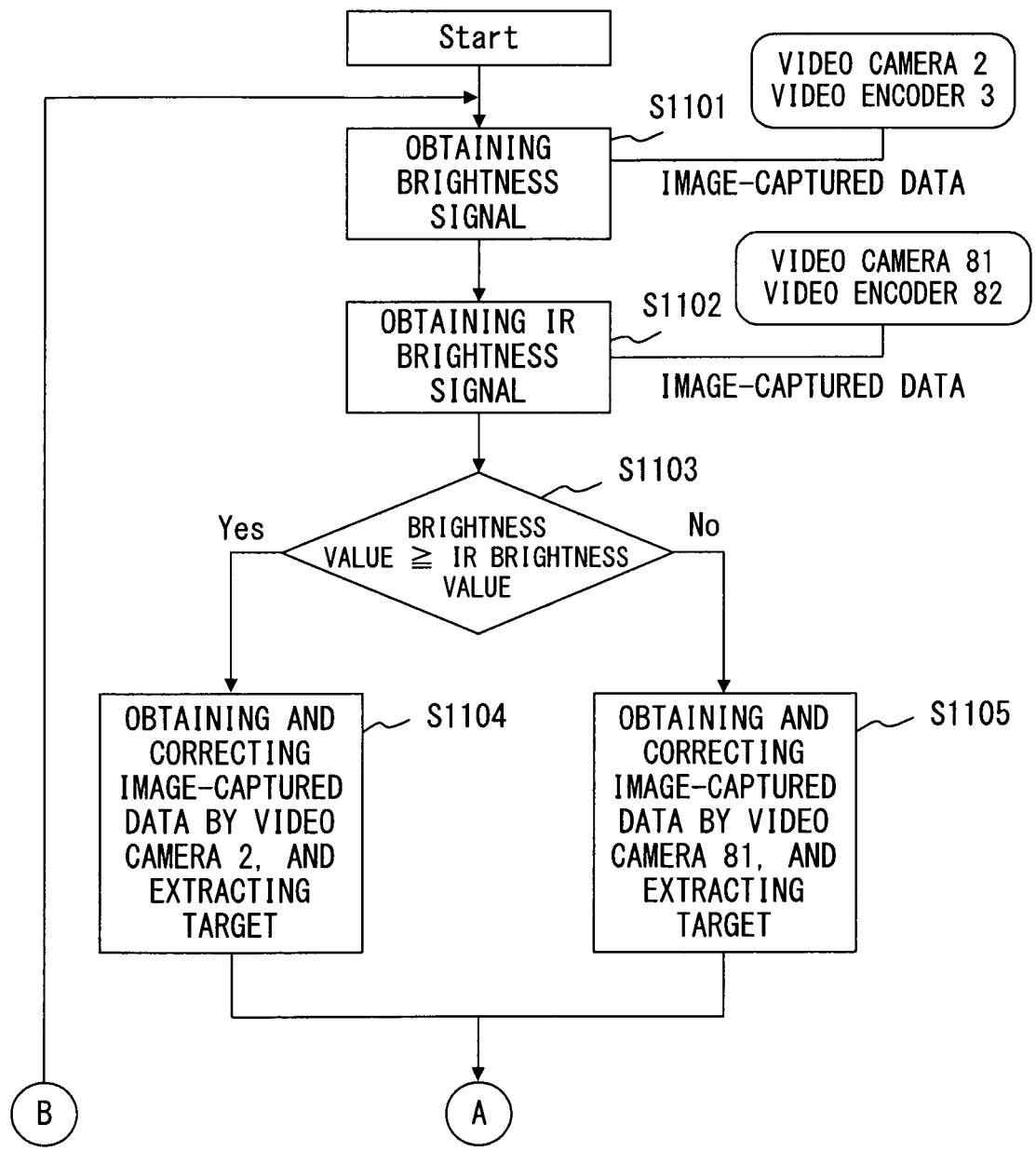
F I G. 1 1 A

| TARGET ID | IR TARGET SETTING DATA ||||||| THRESHOLD VALUE 2 (ASPECT RATIO DATA) | POSITION DATA |
|---|---|---|---|---|---|---|---|---|---|
| | IR IMAGE DATA | IR OUTLINE DATA | IR COLOR DATA | IR PATTERN DATA | IR CHARACTER DATA | | | | |
| 1 | IR IMAGE 1 | IR OUTLINE 1 | IR COLOR 1 | IR PATTERN 1 | IR CHARACTER 1 | | | RATIO 1 | POSITION DATA 1 |
| 2 | IR IMAGE 2 | IR OUTLINE 2 | IR COLOR 2 | IR PATTERN 2 | IR CHARACTER 2 | | | RATIO 2 | POSITION DATA 2 |
| 3 | IR IMAGE 3 | IR OUTLINE 3 | IR COLOR 3 | IR PATTERN 3 | IR CHARACTER 3 | | | RATIO 3 | POSITION DATA 3 |
| 4 | IR IMAGE 4 | IR OUTLINE 4 | IR COLOR 4 | IR PATTERN 4 | IR CHARACTER 4 | | | RATIO 4 | POSITION DATA 4 |
| 5 | IR IMAGE 5 | IR OUTLINE 5 | IR COLOR 5 | IR PATTERN 5 | IR CHARACTER 5 | | | RATIO 5 | POSITION DATA 5 |
| 6 | IR IMAGE 6 | IR OUTLINE 6 | IR COLOR 6 | IR PATTERN 6 | IR CHARACTER 6 | | | RATIO 6 | POSITION DATA 6 |
| 7 | IR IMAGE 7 | IR OUTLINE 7 | IR COLOR 7 | IR PATTERN 7 | IR CHARACTER 7 | | | RATIO 7 | POSITION DATA 7 |
| 8 | IR IMAGE 8 | IR OUTLINE 8 | IR COLOR 8 | IR PATTERN 8 | IR CHARACTER 8 | | | RATIO 8 | POSITION DATA 8 |
| 9 | IR IMAGE 9 | IR OUTLINE 9 | IR COLOR 9 | IR PATTERN 9 | IR CHARACTER 9 | | | RATIO 9 | POSITION DATA 9 |
| 10 | IR IMAGE 10 | IR OUTLINE 10 | IR COLOR 10 | IR PATTERN 10 | IR CHARACTER 10 | | | RATIO 10 | POSITION DATA 10 |
| 11 | IR IMAGE 11 | IR OUTLINE 11 | IR COLOR 11 | IR PATTERN 11 | IR CHARACTER 11 | | | RATIO 11 | POSITION DATA 11 |
| 12 | IR IMAGE 12 | IR OUTLINE 12 | IR COLOR 12 | IR PATTERN 12 | IR CHARACTER 12 | | | RATIO 12 | POSITION DATA 12 |
| 13 | IR IMAGE 13 | IR OUTLINE 13 | IR COLOR 13 | IR PATTERN 13 | IR CHARACTER 13 | | | RATIO 13 | POSITION DATA 13 |
| 14 | IR IMAGE 14 | IR OUTLINE 14 | IR COLOR 14 | IR PATTERN 14 | IR CHARACTER 14 | | | RATIO 14 | POSITION DATA 14 |
| 15 | IR IMAGE 15 | IR OUTLINE 15 | IR COLOR 15 | IR PATTERN 15 | IR CHARACTER 15 | | | RATIO 15 | POSITION DATA 15 |
| ……… | ……… | ……… | ……… | ……… | ……… | | | ……… | ……… |
| N−1 | IR IMAGE n−1 | IR OUTLINE n−1 | IR COLOR n−1 | IR PATTERN n−1 | IR CHARACTER n−1 | | | RATIO n−1 | POSITION DATA n−1 |
| N | IR IMAGE n | IR OUTLINE n | IR COLOR n | IR PATTERN n | IR CHARACTER n | | | RATIO n | POSITION DATA n |

COUNT VALUE ↑

AVAILABLE IN COMMON AS THRESHOLD VALUE 2 AND POSITION DATA OF FIG. 4

F I G. 1 2

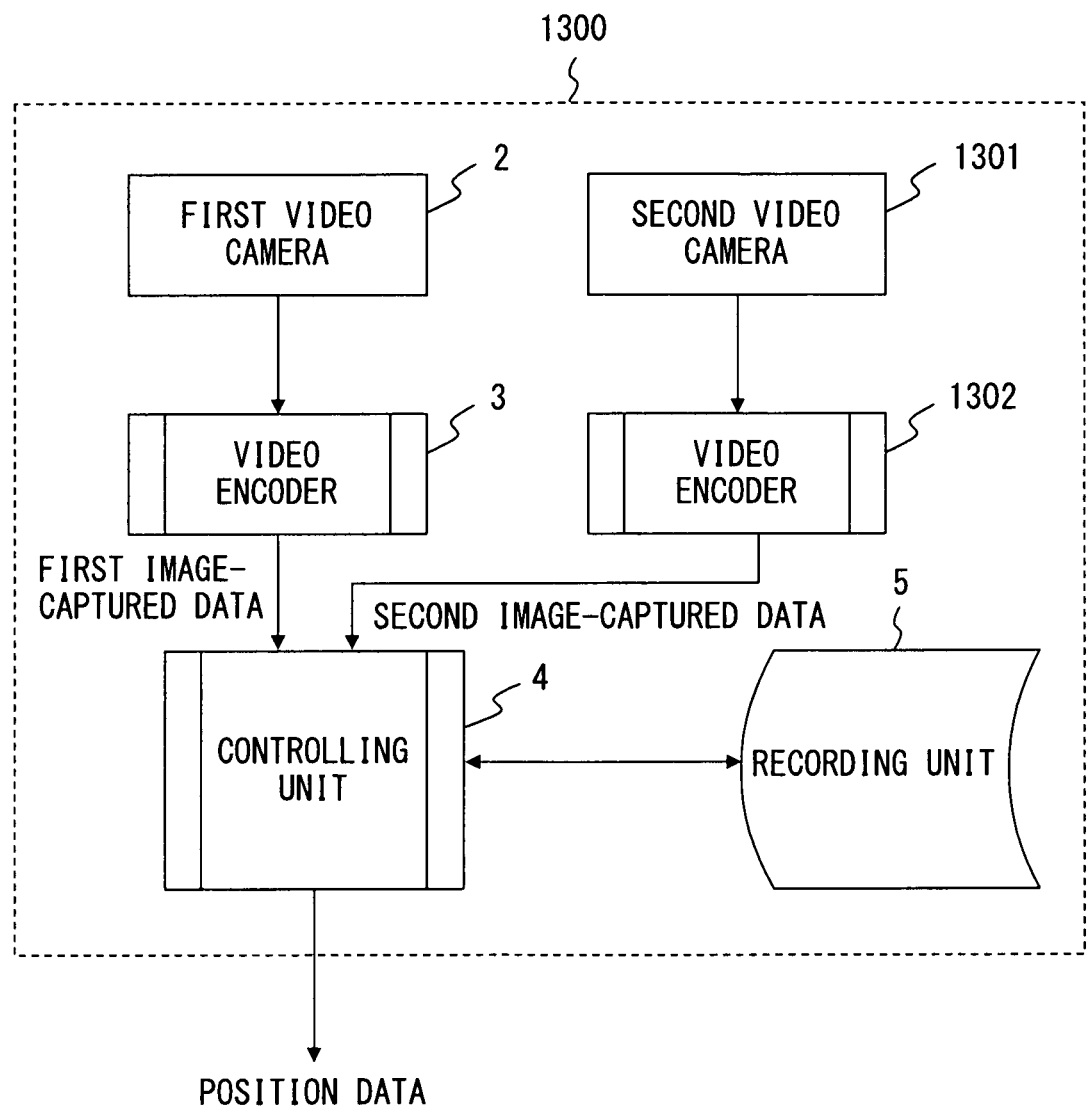
F I G. 1 3

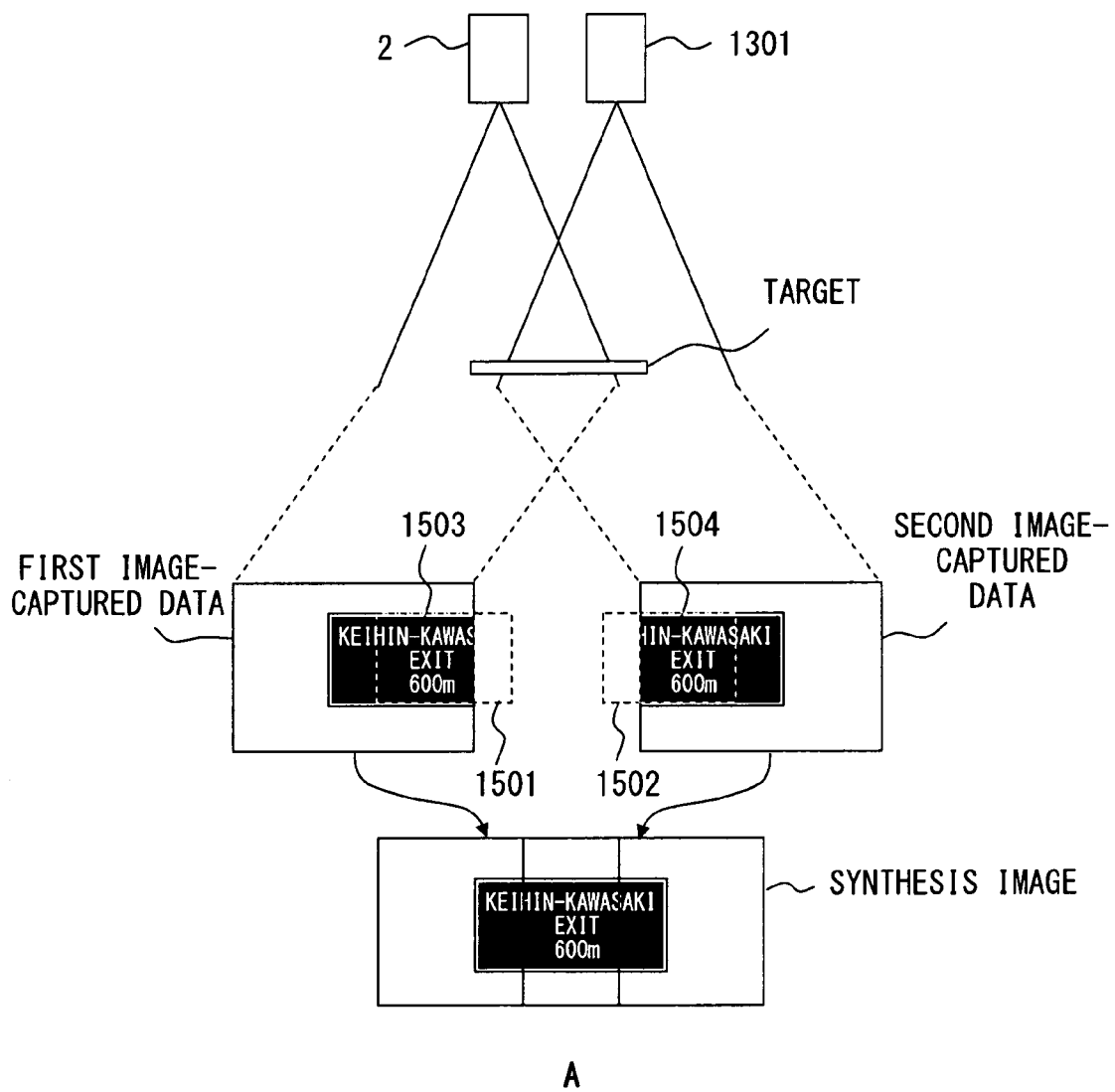
F I G. 1 5

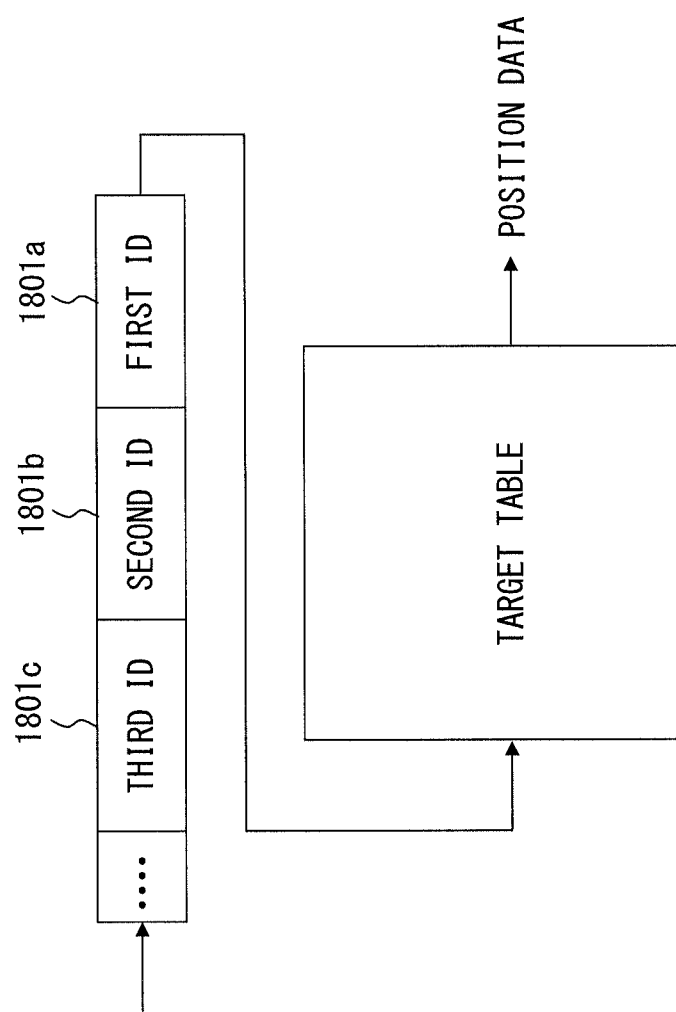
F I G. 1 8

| TARGET ID | TARGET SETTING DATA | | | | | THRESHOLD VALUE 2 (ASPECT RATIO DATA) | POSITION DATA |
|---|---|---|---|---|---|---|---|
| | IMAGE DATA | OUTLINE DATA | COLOR DATA | PATTERN DATA | CHARACTER DATA | | |
| 1 | IMAGE 1 | OUTLINE 1 | COLOR 1 | PATTERN 1 | CHARACTER 1 | RATIO 1 | |
| 2 | IMAGE 2 | OUTLINE 2 | COLOR 2 | PATTERN 2 | CHARACTER 2 | RATIO 2 | |
| 3 | IMAGE 3 | OUTLINE 3 | COLOR 3 | PATTERN 3 | CHARACTER 3 | RATIO 3 | POSITION DATA 3 |
| 4 | IMAGE 4 | OUTLINE 4 | COLOR 4 | PATTERN 4 | CHARACTER 4 | RATIO 4 | |
| 5 | IMAGE 5 | OUTLINE 5 | COLOR 5 | PATTERN 5 | CHARACTER 5 | RATIO 5 | |
| 6 | IMAGE 6 | OUTLINE 6 | COLOR 6 | PATTERN 6 | CHARACTER 6 | RATIO 6 | POSITION DATA 6 |
| 7 | IMAGE 7 | OUTLINE 7 | COLOR 7 | PATTERN 7 | CHARACTER 7 | RATIO 7 | |
| 8 | IMAGE 8 | OUTLINE 8 | COLOR 8 | PATTERN 8 | CHARACTER 8 | RATIO 8 | |
| 9 | IMAGE 9 | OUTLINE 9 | COLOR 9 | PATTERN 9 | CHARACTER 9 | RATIO 9 | POSITION DATA 9 |
| 10 | IMAGE 10 | OUTLINE 10 | COLOR 10 | PATTERN 10 | CHARACTER 10 | RATIO 10 | |
| 11 | IMAGE 11 | OUTLINE 11 | COLOR 11 | PATTERN 11 | CHARACTER 11 | RATIO 11 | |
| 12 | IMAGE 12 | OUTLINE 12 | COLOR 12 | PATTERN 12 | CHARACTER 12 | RATIO 12 | POSITION DATA 12 |
| 13 | IMAGE 13 | OUTLINE 13 | COLOR 13 | PATTERN 13 | CHARACTER 13 | RATIO 13 | |
| 14 | IMAGE 14 | OUTLINE 14 | COLOR 14 | PATTERN 14 | CHARACTER 14 | RATIO 14 | |
| 15 | IMAGE 15 | OUTLINE 15 | COLOR 15 | PATTERN 15 | CHARACTER 15 | RATIO 15 | POSITION DATA 15 |
| ......... | ......... | ......... | ......... | ......... | ......... | ......... | ......... |
| N | IMAGE n | OUTLINE n | COLOR n | PATTERN n | CHARACTER n | RATIO n | POSITION DATA n |

↑ COUNT VALUE

MOBILE UNIT POSITION DETECTING APPARATUS AND MOBILE UNIT POSITION DETECTING METHOD

CROSS-REFERENCE TO RELATED APPLICATION

This application is a continuation application of International PCT application No. PCT/JP2009/003667 which was filed on Jul. 31, 2009.

FIELD

The present invention relates to a technique for detecting a position of a mobile unit.

BACKGROUND

Conventional techniques by which a mobile unit autonomously detects its position include GPS (Global Positioning System), optical beacon high-precision positioning, a lane marker and the like. GPS is unsuitable for high-precision positioning in a mobile unit due to the principle of positioning performed by receiving a radiowave emitted from an artificial satellite. Moreover, optical beacon high-precision positioning cannot perform positioning at a site where an optical beacon is not installed, and for a lane marker, its infrastructure equipment cost becomes very high.

Therefore, a method using an image shot by an image capturing device included in a mobile unit is known as a method of detecting a position of the mobile unit. A method of detecting a target of a known size from an image and of calculating a distance to the target based on the size of the target in the image, and a method of detecting a plurality of targets installed at known sites from an image and of calculating a position based on a relationship among positions of the plurality of targets are known.

For example, the following technique is known. A target such as a road sign, a traffic signal or the like positioned ahead of an automobile is shot with an image sensor when the automobile is running on a road, and the image is input to a processing device. The processing device processes the shot image with an image processing unit, and classifies the type of the target. The classified target is compared with shape data stored in a knowledge base, and its tilt is corrected. Thereafter, the image processing unit calculates the size of the shot target in the image as an angle (rad), and outputs the calculated angle to a distance calculating unit. The distance calculating unit calculates a distance to the target by using the angle (rad) that indicates the size of the shot target, and data that indicates the size of the target, which is stored in the knowledge base.

Additionally, an image of a landmark installed, for example, along a route of a mobile unit is captured with an image capturing unit, and position data of three landmarks prestored in a storing unit are read if at least three or more landmarks are recognized. Moreover, a technique of calculating a relative angle among landmarks viewed from a mobile unit based on an image, and of calculating the current position of the mobile unit based on position data and the angle data is known.

Furthermore, the following technique is known. For example, in a processing unit, an outline area of a road sign is extracted after image data of the road sign captured by a moving video camera is converted into HSV color system using a hue, saturation and a value as criteria. A rectangular outline is identified by using values in directions horizontal and vertical to the extracted outline area. Then, an absolute position of the road sign is determined based on positions of a plurality of outlines identified based on a plurality of pieces of image data, of the road sign captured in time series and an absolute position of the video camera at a time point when each of the plurality of pieces of image data is captured. Note that HSV stands for Hue, Saturation and Value.

[Patent Document 1] Japanese Laid-open Patent Publication No. 08-219775
[Patent Document 2] Japanese Laid-open Patent Publication No. 2001-142532
[Patent Document 3] Japanese Laid-open Patent Publication No. 2003-85535
[Patent Document 4] Japanese Laid-open Patent Publication No. 2006-53775

SUMMARY

According to an aspect of the embodiment, a mobile unit position detecting apparatus includes the following components.

The mobile unit position detecting apparatus in one aspect of the present invention for sequentially or intermittently shooting, with an image capturing device, a target installed in the vicinity of a route on which a mobile unit can move, and for detecting a position of the mobile unit based on the target in a shot image includes target position extracting unit and target position outputting unit.

The target position extracting unit identifies image data that matches image data of the target in the image from among image data of a plurality of targets by making a comparison between the image data of the plurality of targets, which are recorded in a recording unit, and the image data of the target in the image. Then, the target position extracting unit obtains position data that is recorded in the recording unit, is associated with the identified image data and indicates a position when the mobile unit approaches the target at a predetermined distance.

The target position outputting unit outputs the position data if determining that the target in the image changes to a shape, recorded in the recording unit, of the target in the image when the mobile unit approaches the target at the predetermined distance.

The object and advantages of the embodiment will be realized and attained by means of the elements and combinations particularly pointed out in the claims.

It is to be understood that both the foregoing general description and the following detailed description are exemplary and explanatory and are not restrictive of the embodiment, as claimed.

BRIEF DESCRIPTION OF DRAWINGS

FIG. 2 is a block diagram illustrating one example of a configuration of a mobile unit position detecting apparatus in an embodiment 1;

FIG. 3 is a block diagram illustrating one example of a configuration of a controlling unit in the embodiment 1;

FIG. 4 illustrates one example of a structure of a target table in the embodiment 1;

FIG. 5 illustrates one example of a configuration of a target detecting unit in the embodiment 1;

FIG. 10 illustrates one example of a configuration of a camera switching unit of the embodiment 2;

FIG. 11A is a flowchart illustrating one example of operations of the mobile unit position detecting apparatus of the embodiment 2;

FIG. 12 illustrates one example of a structure of a target table used in the embodiment 2;

FIG. 13 is a block diagram illustrating one example of a configuration of a mobile unit position detecting apparatus in an embodiment 3;

FIG. 15 illustrates one example where a camera image synthesizing unit generates a synthesis image by synthesizing first image-captured data and second image-captured data;

FIG. 18 is a block diagram illustrating one example of a configuration of a target pattern position information converting unit in the embodiment 4;

FIG. 19 illustrates one example of a structure of a target table in the embodiment 4;

FIG. 21 is a block diagram illustrating one example of a configuration of a controlling unit in an embodiment 5

DESCRIPTION OF EMBODIMENTS

Embodiments are described in detail below with reference to the drawings.

Since a mobile unit normally measures its current position with GPS, it cannot measure the current position with high precision in some cases. Accordingly, in this embodiment, a target positioned at a known site is detected from an image obtained by an image capturing device included in the mobile unit, and a position of the target is identified based on a state of a shape change of the target in the image, which occurs with a move. When the mobile unit reaches a predetermined position under the identified target, position data that the mobile unit currently possesses is changed to position data of the identified target, which is recorded in association with the identified target. As a result, the mobile unit can autonomously obtain the highly precise position data.

Figure 1:
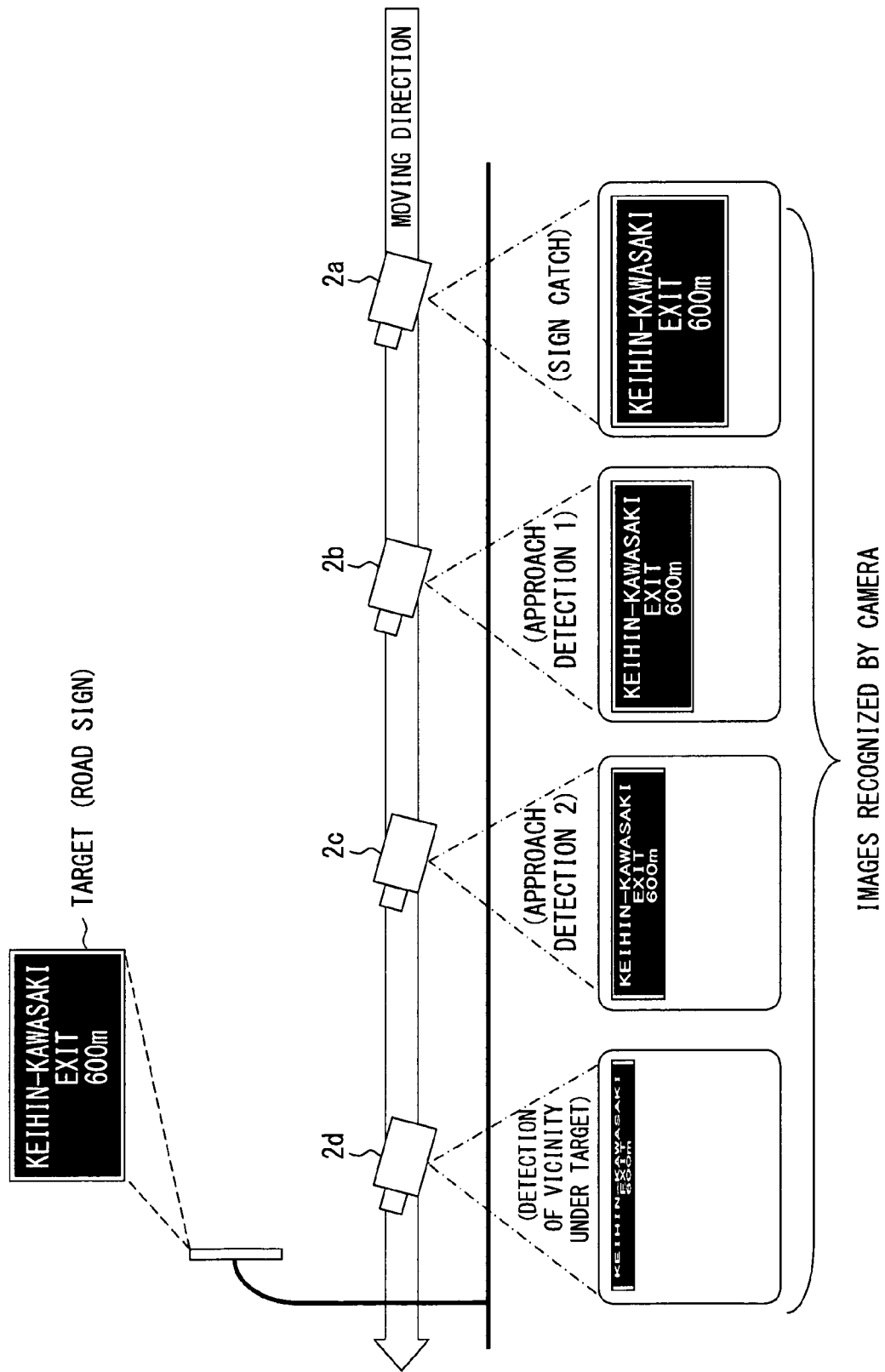
FIG. 1 illustrates a shape change of a target (a road sign or the like) in images when the target is sequentially or intermittently shot with a video camera included in a mobile unit during a move.

The state of the shape change is described with reference to FIG. 1. FIG. 1 illustrates the shape change of a target in the image when the target (road sign or the like) is sequentially or intermittently shot while a video camera 2 (image capturing device) included in a mobile unit is moving in a direction (moving direction) indicated with an arrow.

The position of the video camera 2a is a position where the target matches any of a plurality of targets shot and recorded in advance when the target is included in the shot image (sign catch).

The position of the video camera 2b is a position where the target changes to a shape where a length of the target in a vertical direction in the shot image is reduced since the mobile unit approaches the target from the position shot by the video camera 2a (approach detection 1).

The position of the video camera 2c is a position where the target changes to a shape where the length of the target in the vertical direction in the shot image is further reduced since the mobile unit further approaches the target from the position shot by the video camera 2b (approach detection 2).

The position of the video camera 2d is a position where the target changes to a shape where the length of the target in the vertical direction in the shot image is still further reduced since the mobile unit moves in close vicinity under the target (detection of vicinity under target). When the mobile unit moves in close vicinity under the target, the target in the shot image nearly takes the shape of a linear line.

By using the shape change of the target in the image shot in this way, the current position data of the mobile unit is modified.

This embodiment refers to a case where the mobile unit is assumed to be a vehicle (automobile, motorized bicycle, light car, trolleybus and the like) and a target is assumed to be a road sign installed on a road. However, the mobile unit is not limited to the vehicle. The mobile unit may be a rail car, a construction vehicle, an agriculture vehicle, an industrial vehicle, ship and the like. Moreover, the target is not limited to the road sign. The target may be a building or the like.

An embodiment 1 is described.

FIG. 2 is a block diagram illustrating one example of a configuration of a mobile unit position detecting apparatus in the embodiment 1.

The mobile unit position detecting apparatus 1 in the embodiment 1 includes a video camera 2, a video encoder 3, a controlling unit 4 and a recording unit 5.

The video camera 2 is an image capturing device included in a mobile unit. The video camera 2 sequentially or intermittently shoots a target, converts the shot image into a video signal, and transfers the video signal to the video encoder 3. For example, the video camera 2 is an image capturing device or the like including an image capturing element (such as a CCD (Charge Coupled Device) image sensor, a CMOS (Complementary Metal Oxide Semiconductor) image sensor or the like). Moreover, as the video signal, for example, an NTSC (National Television System Committee) signal, another video signal or the like may be used.

The video encoder 3 generates image-captured data (digital signal) by encoding the video signal (analog signal) shot by the video camera 2. Here, the video signal may be compressed, for example, by using MPEG 4 AV (H.264) or by using JPEG or another method as a video encoding method. The video encoder 3 may be hardware (a dedicated IC or the like), or may be implemented with software. If the image-captured data (digital signal) is directly output from the video camera 2, the video encoder 3 may not be used.

The controlling unit 4 extracts position data based on the image-captured data obtained from the video encoder 3, and data recorded in the recording unit 5. A CPU (Central Processing Unit), a programmable device (such as an FPGA (Field Programmable Gate Array), a PLD (Programmable Logic Device) or the like) may be used as the controlling unit 4. The controlling unit 4 will be described in detail later.

In the recording unit 5, a program, a table, data and the like are recorded. The recording unit 5 is a memory such as a ROM (Read Only Memory), a RAM (Random Access Memory), a hard disk or the like. Moreover, the recording unit 5 may record data such as a parameter value, a variable value and the like, or may be used as a working area.

FIG. 3 is a block diagram illustrating one example of a configuration of the controlling unit 4 in the embodiment 1.

The controlling unit 4 includes target position extracting unit and target position outputting unit.

The target position extracting unit makes a comparison between image data of a plurality of targets recorded in the recording unit and image data of a target in an image, and identifies image data that matches the image data of the target in the image from among the image data of the plurality of targets. Then, the target position extracting unit obtains position data that is recorded in the recording unit, is associated with the identified image data and indicates a position when the mobile unit approaches the target at a predetermined distance.

The target position outputting unit outputs the position data if determining that the target in the image changes to a shape of the target in the image, which is recorded in the recording unit, when the mobile unit approaches the target at the predetermined distance.

The target position extracting unit includes a target detecting unit 21 and a target position information converting unit 24. The target position outputting unit includes an aspect ratio calculating unit 22, a comparing unit 25 and an FF unit 26 (data storing unit).

The target detecting unit 21 obtains image-captured data from the video encoder 3, and obtains a matching ratio between data of the target included in the image-captured data and target setting data that is prerecorded in the target data recording unit 23 and will be described later. As a method of detecting the target from the image-captured data, for example, data of an outline, a color, a pattern, a character and the like may be extracted based on information of pixels that configure the image, and the target may be detected by using the extracted data, or the target may be detected by using an existing technique.

Next, the target detecting unit 21 detects target setting data having the highest correlation with the target in the image based on the matching ratio, and obtains a target ID (identification number) that is prerecorded in the target data recording unit 23 in association with the target setting data as will be described later. A correlation between the target in the shot image and the target setting data will be described later.

The aspect ratio calculating unit 22 identifies the target by obtaining the target data, and correction data from the target detecting unit 21, and calculates an aspect ratio (length-to-width ratio) while tracking the identified target until the mobile unit approaches in the vicinity of the target. Then, the aspect ratio calculating unit 22 outputs the calculated aspect ratio to the comparing unit 25. Here, the vicinity of the target is a distance such that the aspect ratio reaches a predetermined value as a result of an approach of the mobile unit to the target. The aspect ratio is obtained, for example, by calculating a ratio of the maximum value of a length of the target in a Y direction (vertical direction) to the maximum value of a width of the target in an X direction (horizontal direction). Note that the length and the width of the target in the vertical and the horizontal directions in the image can be represented with the number of pixels, or the like. Regardless of whether the shape of the target is either a square or a shape other than the square, the length and the width in the vertical and the horizontal directions can be represented with the number of pixels, or the like.

The target data recording unit 23 records data (target setting data) of a plurality of images of targets or features of images and a target ID by making an association between them (as a target table to be described later. See FIG. 4). Here, the target setting data is, for example, data of image-captured data of a target, such as a road sign installed on a road, or the like, and is information of pixels that configure the target, and an outline, a color, a pattern, a character and the like of the target, which are generated based on the information of pixels. Note that a traffic, light, a signboard, a building or the like may be assumed as the target other than the road sign.

Additionally, the target data recording unit 23 obtains the target setting data from the recording unit 5, and records the obtained data. If the recording unit 5 is provided with a function of the target data recording unit 23, the controlling unit 4 may not be provided with the target data recording unit 23.

The target position information converting unit 24 obtains a target ID output from the target detecting unit 21, obtains position data that is prerecorded in the target data recording unit 23 in association with a target ID that matches the obtained target, and outputs the obtained position data to the FF 26.

If the recording unit 5 is provided with the function of the target data recording unit 23, the target position information converting unit 24 obtains, from the recording unit 5, the position data corresponding to the target ID.

The comparing unit 25 makes a comparison between the aspect ratio output from the aspect ratio calculating unit 22 and a threshold value 2 prerecorded in the recording unit 5 (or the target data recording unit 23). If the aspect ratio is equal to or lower than the threshold value 2, the comparing unit 25 outputs an enable signal to the FF 26. Here, the threshold value 2 is a value according to which a determination is allowed such that an image of a target in a shot image nearly takes the shape of a linear line. Therefore, an aspect ratio when an image of the target nearly takes the shape of a linear line may be pre-calculated and recorded as the threshold value 2 for each target.

Upon receipt of the enable signal output from the comparing unit 25, the FF 26 outputs the position data output from the target position information converting unit 24.

The target table is described next.

FIG. 4 illustrates one example of the target table. The target table includes "target ID", "target setting data", "threshold value 2 (aspect ratio data)" and "position data". A target ID (identification number) is recorded in a portion corresponding to "target ID" of FIG. 4 in association with each target. In this example, numerals 1, 2, ... , N are assigned.

The target setting data includes columns "image data", "outline data", "color data", "pattern data" and "character data", which respectively record image data, an outline, a color, a pattern, a written character and the like of the target. FIG. 4 illustrates the example where a target ID is associated with the image data, the outline data, the color data, the pattern data and the character data as the target setting data. However, the target ID may be associated only with the image data. Alternatively, the target ID may be associated with a combination of the image data, the outline data, the color data, the pattern data and the character data.

For the image data of a target, a name for linking to the image data of a target shot in advance is recorded in a portion corresponding to "image data" in association with a target ID. For example, a name of a file where the image data is recorded is recorded. In this example, "image 1", "image 2", ... , "image n" are assigned.

The outline data of a target is data of an outline of each target, which is extracted from the target with an image process such as outline extraction or the like. For the outline data, a name for linking to a file where extracted outline data is recorded is recorded in a portion corresponding to "outline data" in association with a target ID. In this example, "outline 1", "outline 2", ... , "outline n" are assigned.

The color data of a target is data of a color of each target, which is obtained by extracting the color (or hue) of the target with an image process. A name for linking to a file where color data is recorded is recorded in a portion corresponding to "color data" in association with a target ID. In this example, "color 1", "color 2", ... , "color n" are assigned.

The pattern data of a target is data of the pattern of each target, which is obtained by extracting the pattern of the target with an image process. A name for linking to a file where pattern data is recorded is recorded in a portion corresponding to "pattern data" in association with a target ID. In this example, "pattern 1", "pattern 2", ... , "pattern n" are assigned.

The data of a character written in a target is data of a character written in each target, which is obtained by extracting the character written in the target with an image process. A name for linking to a file where character data is recorded is recorded in a portion corresponding to "character data" in association with a target ID. In this example, "character 1", "character 2", ... , "character n" are assigned.

The threshold value 2 (aspect ratio data) is data of an aspect ratio of the shape of a target in an image shot when a mobile unit approaches in close vicinity under the target at a predetermined distance. The threshold value 2 (aspect ratio data) is recorded in a portion corresponding to "threshold value 2" in association with a target ID. In this example, "ratio 1", "ratio 2", ... , "ratio n" are assigned.

The position data is data (coordinates, latitude, longitude or the like) that indicates a position where the aspect ratio calculated based on the shape of the target in the image shot when the mobile unit approaches in close vicinity under the target at the predetermined distance reaches a corresponding value of "threshold value 2". The position data is recorded in a portion corresponding to "position data" in association with a target ID. In this example, "position data 1", "position data 2", ... , "position data n" are assigned.

FIG. 5 illustrates one example of a configuration of the target detecting unit 21.

The target detecting unit 21 includes a correcting unit 51, a feature extracting unit 52, a comparing unit 53 and a correlating unit 55.

The correcting unit 51 obtains image-captured data, and corrects a shot image with an existing technique. For example, the correcting unit 51 performs a contrast or brightness correction, a correction for making an image sharp with a filter, a correction to a tilt of the image. Moreover, a distortion aberration, vignetting, lack of sharpness, chromatic aberration of magnification, a colored fringe and the like may be corrected, or corrections such as exposure optimization, backlight correction, noise removal and the like may be performed. Note that the above described corrections may not always be performed. In the example of FIG. 5, the correcting unit 51 outputs correction data B by correcting image-captured data A (including noise).

The feature extracting unit 52 extracts target data from the correction data. In the example of FIG. 5, the feature extracting unit 52 extracts outline data from the correction data B with an edge extraction filter, and extracts a square based on the extracted outline data. Next, the feature extracting unit 52 extracts target data C of FIG. 5 by collecting pixel data of the outline of the square and pixel data within the outline.

Additionally, the feature extracting unit 52 may extract features of the target after extracting the target data from the correction data. Here, the features are data of an outline, a color, a pattern, a character and the like of the target. For example, the outline data is data obtained by taking an outline out of the target in a shot image by using an edge extraction filter or the like. The color data is data of a color for each of pixels that configure the target in the corrected image. Moreover, the pattern data is data of a pattern obtained, for example, by extracting a pattern of the target or the like in the corrected image based on pixels. The character data is obtained by extracting a character included in the target or the like in the corrected image with an existing character recognition technique. The features extracted by the feature extracting unit 52 are not limited to the outline data, the color data, the pattern data and the character data.

The comparing unit 53 obtains a matching ratio by making a comparison between a plurality of piece of target setting data D, E, ... (image data in the target table of FIG. 4) and the target data C extracted by the feature extracting unit 52. If the matching ratio between images is equal to or higher than a preset value (threshold value 1), the comparing unit 53 outputs, to the correlating unit 55, a target ID associated with the image.

For example, if a comparison is made between target images, the matching ratio is calculated by deciding a reference point (pixel) of the target data C and image data of each piece of the target setting data, by detecting a pixel having a matching component (such as a color or the like) sequentially from the reference point, and by calculating "matching ratio= (number of matching pixels/number of pixels of target data C).

In the example of FIG. 5, the target setting data and the target IDs from the target data recording unit 23 are recorded respectively in registers 54a to 54n, and a comparison is made between the target data extracted by the feature extracting unit 52 and the target setting data recorded in the registers 54a to 54n. Target setting data having a matching ratio that is equal to or higher than a preset value (threshold value 1) is selected as a result of the comparison, and a target ID associated with the target setting data, and the matching ratio are output to the correlating unit 55.

As another comparing method, a method of making a comparison between target data and outline data, color data, pattern data, character data and the like of the target setting data is considered. For example, as described for the feature extracting unit 52, the outline data, the color data, the pattern data, the character data and the like are extracted as features of the target data as described for the feature extracting unit 52, a comparison is made between the target data and the outline data, the color data, the pattern data and the character data of the target setting data (FIG. 4), so that the degree of matching is obtained. The, target setting data having a matching ratio of each of the outline data, the color data, the pattern data and the character data, which is equal to or higher than a preset value, is selected, and a target ID corresponding to the selected target setting data, and the matching ratios are, output to the correlating unit 55. As described above, by performing more comparisons (for the outline data, the color data, the pattern data, the character data and the like), the extraction accuracy of a target can be improved.

Additionally, the comparing unit 53 can learn the position of a mobile unit with GPS although its precision is not high. Therefore, only target, setting data of target installed in the vicinity of position data indicated by GPS are selected based on the position data and recorded in the registers 54a to 54n. As a result, the number of pieces of target setting data obtained from the target data recording unit 23 is limited, which eliminates the need for searching for all pieces of the target setting data. Therefore, a target can be detected faster than in a case where a comparison is made for all the pieces of the target setting data.

The correlating unit 55 detects the highest matching ratio from among the matching ratios output from the comparing unit 53, and outputs a target ID associated with the highest matching ratio to the target position information converting unit 24. Moreover, as another method of detecting a matching ratio, for example, a total of matching ratios of the outline data, the color data, the pattern data, the character data and the like is calculated for each target ID, and a target ID having the maximum total is selected. The target ID having the maximum total is selected in the above description. However, the method of detecting a matching ratio is not limited to this one.

Figure 6:
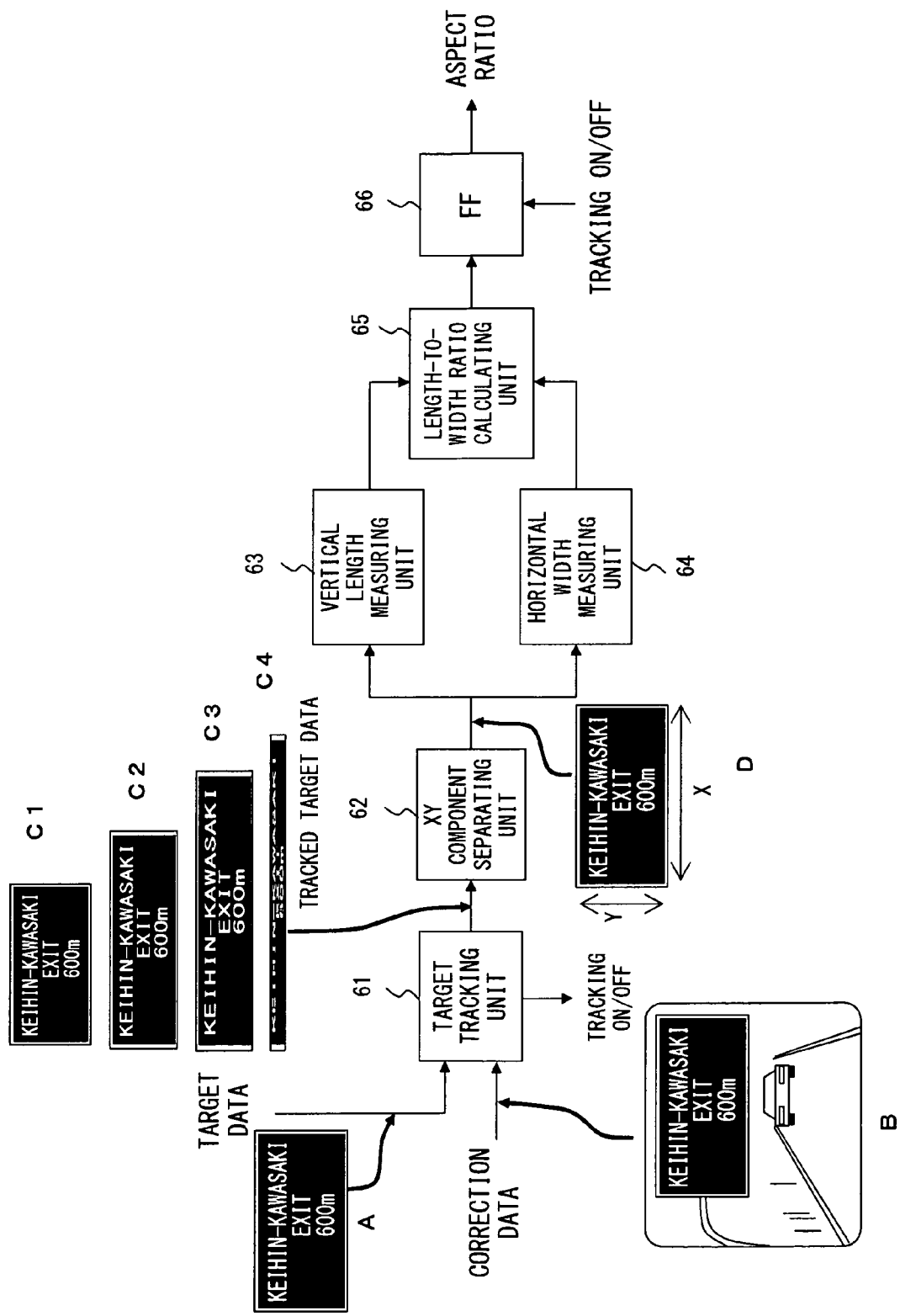
FIG. 6 illustrates one example of a configuration of an aspect ratio calculating unit in the embodiment 1.

FIG. 6 illustrates one example of a configuration of the aspect ratio calculating unit 22.

The aspect ratio calculating unit 22 includes a target tracking unit 61, an XY component separating unit 62, a vertical length measuring unit 63, a horizontal width measuring unit 64, a length-to-width ratio calculating unit 65 and an FF 66 (data storing unit). The target tracking unit 61 obtains correction data and target data from the correcting unit 51, and tracks and extracts a target included in the correction data. In the example of FIG. 6, the aspect ratio calculating unit 22 detects that the target data A is included in the correction data B, and tracks the detected target until the mobile unit moves to the position of the target. However, the shape of the target changes as indicated by C1 to C4 (tracked target data) of FIG. 6 when the mobile unit approaches the target. Therefore, it is difficult to track the target data A only by tracking the shape of the target when being caught. Accordingly, for example, a method of tracking the target data A based on the color or the like of the target is used. Moreover, while tracking the target, the target tracking unit 61 outputs, to the FF 66, a signal (tracking ON/OFF signal of FIG. 6) indicating whether or not the target is being tracked. Furthermore, the target tracking unit 61 outputs the tracked target data to the XY component separating unit 62.

The XY component separating unit 62 analyzes the tracked target data output from the target tracking unit 61, and separates the data into components in the X (horizontal) direction and the Y (vertical) direction. For example, the components in the X direction and the Y direction may be detected by detecting continuous pixels of the same color in the X or the Y direction and recognized as the components in the X or the Y direction. Alternatively, the components may be detected with another method. Note that the XY component separating unit 62 uses correction data that the correcting unit 51 has corrected to facilitate, the detection of the components in the X and the Y directions. However, the XY component separating unit 51 may directly use image-captured data.

The vertical length measuring unit 63 measures the length of the component in the Y direction, which is detected by the XY component separating unit 62. In contrast, the horizontal width measuring unit 64 detects the width of the component in the X direction, which is detected by the XY component separating unit 62. The length of the component in the Y direction and the width of the component in the X direction may be obtained, for example, by counting the number of pixels, or by using another method.

The length-to-width ratio calculating unit 65 calculates an aspect ratio by using the width and the length in the X and the Y directions, which are respectively measured by the horizontal width measuring unit 64 and the vertical length measuring unit 63.

In this example, the aspect ratio is obtained with an equation "aspect ratio=(length in Y direction/width in X direction)". Next, the length-to-width ratio calculating unit 65 outputs the aspect ratio calculated with the above equation to the FF 66.

An output of the FF 66 is enabled when the target detecting unit 21 catches and tracks, a target, and the aspect ratio is output to the comparing unit 25. For example, the output of the FF 66 is enabled if the tracking ON/OFF signal is ON, and the aspect ratio is output to the comparing unit 25.

Operations of the mobile unit position detecting apparatus are described.

Figure 7A:
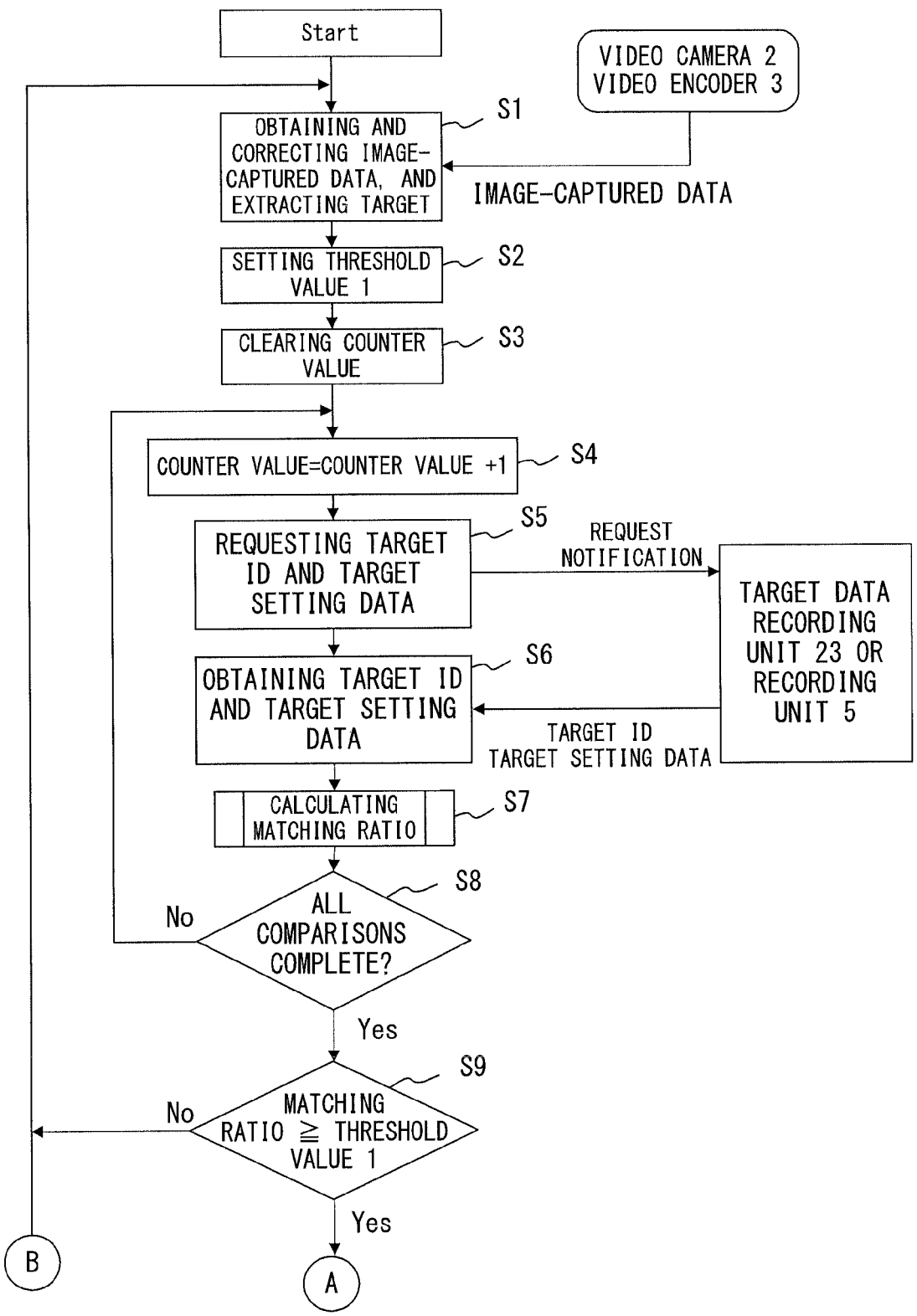
FIG. 7A is a flowchart illustrating one example of operations of the mobile unit position detecting apparatus of the embodiment 1.
Figure 7B:
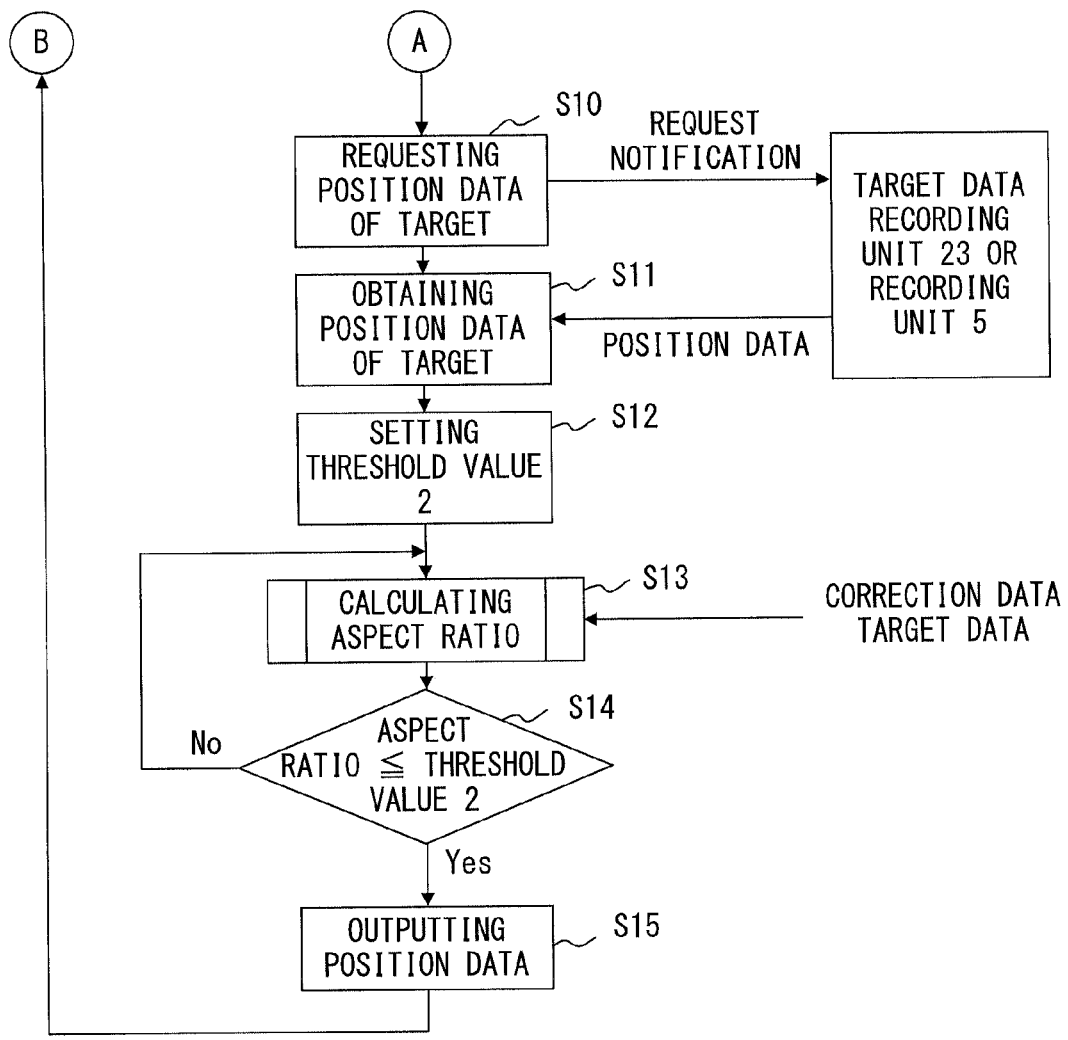
FIG. 7B is a flowchart illustrating one example of the operations of the mobile unit position detecting apparatus of the embodiment 1.

FIGS. 7A and 7B are flowcharts illustrating one example of the operations of the mobile unit position detecting apparatus.

In step S1 (target detection process), the target detecting unit 21 obtains image-captured data that is obtained by digitally converting an image (such as an analog signal) shot by the video camera 2 with the video encoder 3. Next, the target detecting unit 21 generates correction data by correcting the image-captured data, and extracts an image of a target from the correction data. Moreover, the target detecting unit 21 may extract data of an outline, a color, a pattern, a character and the like as features of the target after extracting the image of the target.

In step S2 (target detection process), the target detecting unit 21 sets the threshold value 1. For example, the threshold value 1 is a value that is compared with a matching ratio obtained by making a comparison between the image of the target extracted in step S1 and each piece of target setting data obtained from the recording unit 5 (or the target data recording unit 23). For example, if target setting data having a matching ratio of 90 percent or higher is selected, the threshold value 1 is set to 0.9.

Note that the threshold value 1 corresponding to each piece of image data of the target setting data may be set, or the threshold value 1 corresponding to each of the outline data, the color data, the pattern data and the character data of the target setting data may be set also when these data are used.

In step S3 (target detection process), the target detecting unit 21 clears the value of a counter, which the target detecting unit 21 uses to select a target ID and target setting data from the target table in the recording unit 5 (or the target data recording unit 23). Here, for the selection of the target ID and the target setting data, by way of example, the count value of the counter and the value of the target ID are linked, and a target ID "1" and target setting data corresponding to the target ID are selected if the count value is "1". In this example, the target ID depicted in the target table of FIG. 4 starts at "1". Therefore, the count value is set to "0".

In step S4 (target detection process), the target detecting unit 21 increments the count value by 1 (count value=count value+1) in order to obtain a target ID and target setting data from the recording unit 5 (or the target data recording unit 23).

In step S5 (target detection process), the target detecting unit 21 outputs, to the recording unit 5 (or the target data recording unit 23), a count value (request notification) for obtaining the target ID and the target setting data.

Next, upon obtaining the request notification, the recording unit 5 (or the target data recording unit 23) detects the target ID corresponding to the count value, and outputs the target ID and the target setting data to the target detecting unit 21. In step S6 (target detection process), the target detecting unit 21 obtains the target ID and the target setting data.

In step S7 (target detection process), the target detecting unit 21 calculates a matching ratio as described for the comparing unit 53.

In step S8 (target detection process), the target detecting unit 21 determines whether or not comparisons between the target data and all pieces of the target setting data have been complete. If the comparisons have been complete ("YES"), the flow goes to step S9. If the comparisons have not been complete ("NO"), the flow goes back to step S4. For example, the target detecting unit 21 determines whether or not the comparisons have been made between the target data and the target setting data associated with all the target IDs "1" to "N" illustrated in FIG. 4.

In step S9 (target detection process), the target detecting unit 21 determines whether or not the matching ratio is equal to or higher than the threshold value 1. If the matching ratio is equal to or higher than the threshold value 1 ("YES"), the target detecting unit 21 selects a target ID corresponding to the matching ratio. Then, the flow goes to step S10. If the matching ratio is lower than the threshold value 1 ("NO"), the flow goes back to step S1. For example, if the threshold value 1 is set to 0.9, and if the matching ratio between the extracted target and the image data in the target table illustrated in FIG. 4 is 0.91 (91 percent), the matching ratio is equal to or higher than the threshold value 1. Therefore, the flow goes to step S10. If there are a plurality of matching ratios determined to be equal to or higher than the threshold value 1, for example, the highest matching ratio is selected from among the plurality of matching ratios as described for the correlating unit 55, and a target ID corresponding to the highest matching ratio is selected. Then, the flow goes to step S10. If all the matching ratios are lower than the threshold value 1, the target is not considered to be included, in the current image-captured data. Therefore, the flow goes back to step S1, in which a target is searched by using new image-captured data.

In step S10 (target position information conversion process), the target ID is obtained from the target detecting unit 21. Then, a request notification including the target ID is made to the recording unit 5 (or the target data recording unit 23) in order to obtain position data corresponding to the target ID.

Next, the recording unit 5 (or the target data recording unit 23) detects, from the target table, the position data associated with the target ID upon obtaining the request notification, and outputs the position data to the target position information converting unit 24.

In step S11 (target position information conversion process), the target position information converting unit 24 obtains the position data output from the recording unit 5 (or the target data recording unit 23).

In step S12 (comparison process), the comparing unit 25 obtains a threshold value 2 from the target data recording unit 23 based on the current target ID, and sets the threshold value 2. For example, the threshold value 2 is set by selecting any of "ratio 1", "ratio 2", . . . recorded in "threshold value 2" in the target table, which corresponds to the target ID obtained in step S9.

In step S13 (aspect ratio calculation process), the aspect ratio calculating unit 22 tracks the target based on correction data and the target data, which are output from the target detecting unit 21, and calculates an aspect ratio. The target captured in the image is tracked until the mobile unit approaches in the vicinity of the target as described for the target tracking unit 61. Moreover, the aspect ratio is calculated by measuring a vertical length and a horizontal width from components in the X and the Y directions of the target in the image.

In step S14 (comparison process), the comparing unit 25 makes a comparison between the aspect ratio calculated in step S13 and the threshold value 2. If the aspect ratio is equal to or lower than the threshold value 2 ("YES"), the flow goes to step S15. If the aspect ratio is higher than the threshold value 2 ("NO"), the flow goes back to step 13. Namely, when the mobile unit approaches in the vicinity of the target, the vertical length (length in the Y direction) becomes shorter in comparison with the horizontal width (width in the X direction) in the shape of the target in the image. Accordingly, the aspect ratio approaches 0 and results in a value equal to or smaller than the threshold value 2 if it is calculated with "width in X direction/length in Y direction".

In step S15 (position data output process), the position data is output. Then, the flow goes back to step S1. For example, the position data is output to an appliance (car navigation system or the like) that needs the position data.

As described above, with the mobile unit position detection, a target (road sign or the like) in an image shot by an image capturing device included in a mobile unit is identified, and position data recorded in association with the identified target is obtained. Next, with the mobile unit position detection, the identified target is tracked up to a position where the target is installed, and a shape change of the target being tracked in the image is detected. Then, it is determined whether or not the shape change of the target takes a predetermined shape. If the shape change takes the predetermined shape as a result of the determination, the current position data is updated by recognizing that the mobile unit has reached from the installation site of the target at a predetermined distance. Alternatively, the position data is output to an appliance that needs the position data.

As described above, according to this embodiment, the position of a mobile unit can be autonomously identified based on a shape change of a target in an image captured by an image capturing device included in the mobile unit. Moreover, since position data can be updated when the mobile unit has reached from an installation site of the target at a predetermined distance, the position of the mobile unit can be obtained with high precision.

Additionally, an optical beacon, a lane marker and the like, which are needed by conventional techniques, are not used, thereby eliminating the need for a very high installation cost, leading to a significant reduction in the installation cost.

An embodiment 2 is described next.

If a target is extracted from an image shot with a visible ray at nighttime (or in the bad weather such as rain, fog or the like), an image of good quality cannot be obtained due to lack of light intensity. As a result, it is difficult to identify the target. Accordingly, the embodiment 2 refers to a method of detecting a position of a mobile unit with high precision even at nighttime (or in the bad weather).

Figure 8:
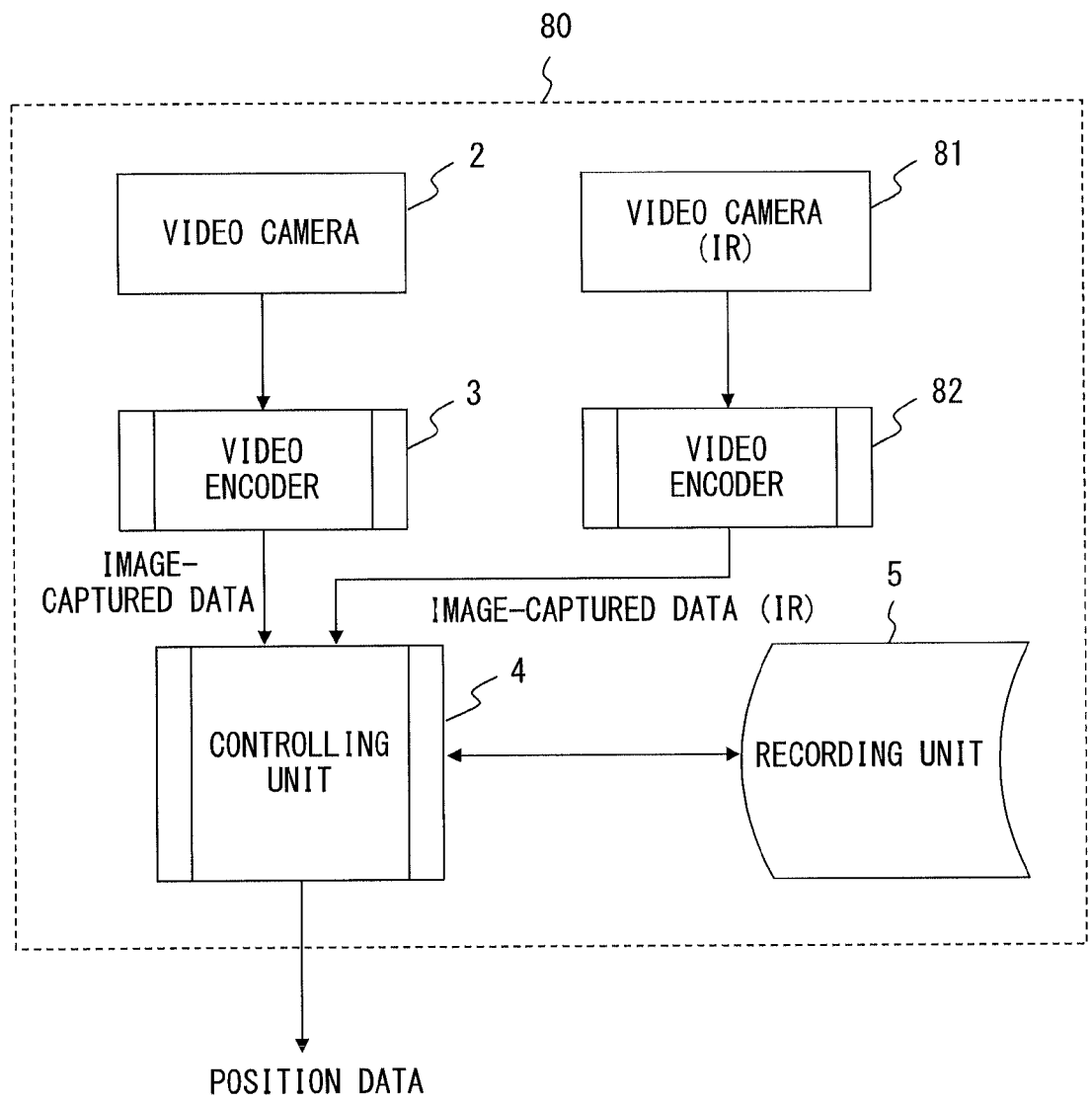
FIG. 8 is a block diagram illustrating one example of a configuration of a mobile unit position detecting apparatus in an embodiment 2.

FIG. 8 is a block diagram illustrating one example of a configuration of a mobile unit position detecting apparatus in the embodiment 2.

The mobile unit position detecting apparatus 80 in the embodiment 2 includes the video camera 2, the video encoder 3, a video camera 81 (infrared video camera), a video encoder 82, the controlling unit 4 and the recording unit 5. In the embodiment 2, a target can be extracted even at nighttime (or in the bad weather) by adding the video camera 81 and the video encoder 82 to the configuration of the embodiment 1.

Figure 9:
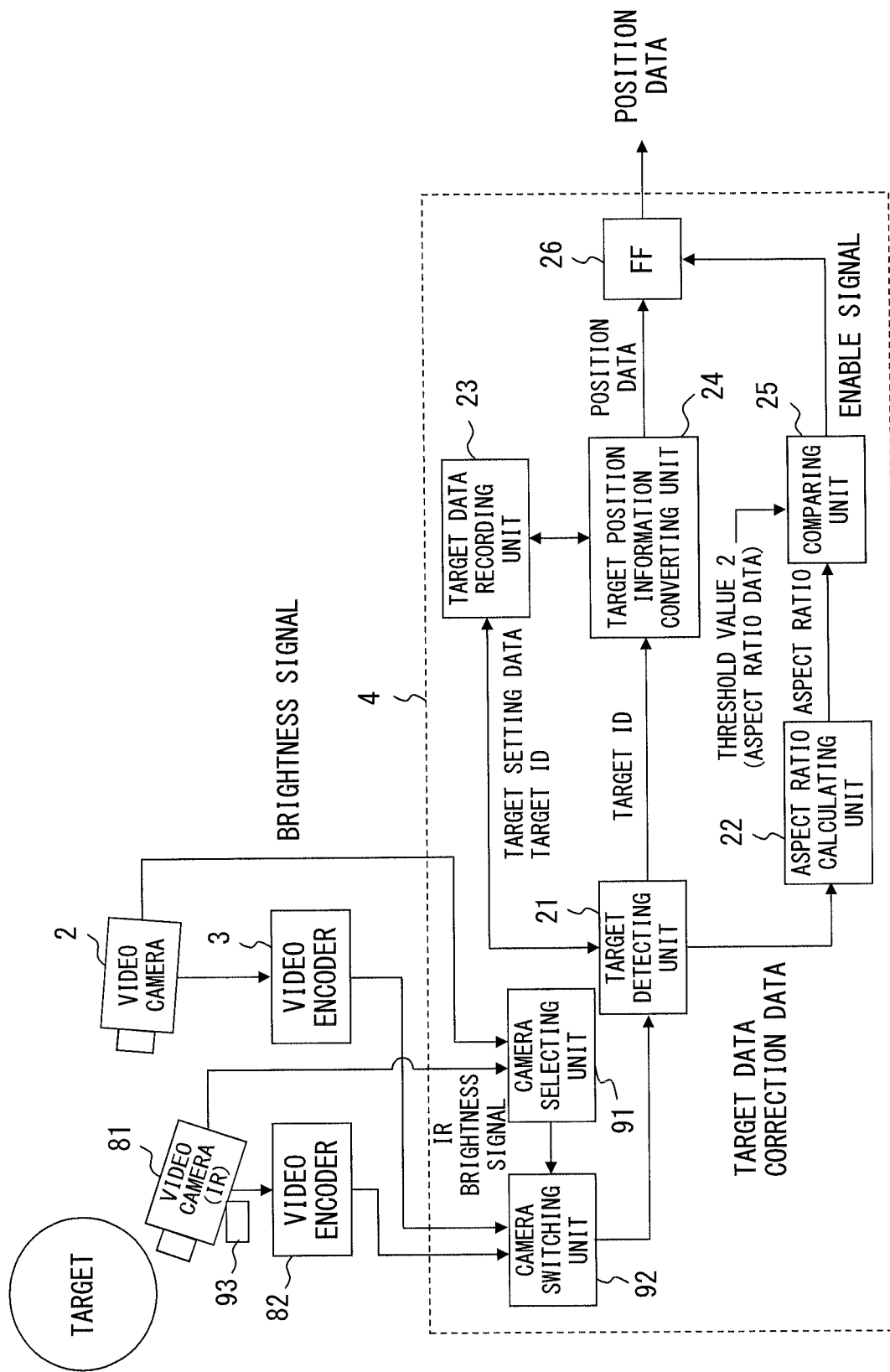
FIG. 9 is a block diagram illustrating one example of a configuration of a controlling unit in the embodiment 2.

The video camera 81 is an infrared image capturing device provided in a mobile unit. The video camera 81 sequentially or intermittently shoots a target, converts a shot image into a video signal, and transfers the video signal to the video encoder 82. The video camera 81 is, for example, an image capturing device including an image capturing element (a CCD (Charge Coupled Device) image sensor, a CMOS (Complementary Metal Oxide Semiconductor) image sensor or the like). Moreover, the video signal may be, for example, an NTSC (National Television System Committee) signal or the like, or may be another video signal. Moreover, the video camera 81 externally has an infrared irradiator 93 as illustrated in FIG. 9. Note that the infrared irradiator 93 may be provided inside the video camera 81. For example, the infrared irradiator 93 starts irradiating an infrared ray upon sensing ambient brightness.

The video encoder 82 generates image-captured data (digital signal) by encoding a video signal (analog signal) shot with an infrared ray by the video camera 81. Here, the video signal may be compressed by using, for example, MPEG 4 AV (H.264) or by using JPEG or another method as a video encoding method. The video encoder 82 may be hardware (such as a dedicated IC or the like), or may be software. If the image-captured data (digital signal) is directly output from the video camera 81, the video encoder 82 may not be used.

FIG. 9 is a block diagram illustrating one example of a configuration of the controlling unit in the embodiment 2.

The controlling unit 4 includes the target detecting unit 21, the aspect ratio calculating unit 22, the target data recording unit 23, the target position information converting unit 24, the comparing unit 25, the FF 26 (data storing unit, for example, flip-flop), a camera selecting unit 91 and a camera switching unit 92.

The camera selecting unit 91 receives a brightness signal and an IR brightness signal, which are respectively output from the video camera 2 and the video camera 81, and determines brightness levels of the brightness signal and the IR brightness signal. If the brightness level of the brightness signal is higher than that of the IR brightness signal as a result of the determination, the camera selecting unit 91 outputs a select signal for selecting the video camera 2 to the camera switching unit 92. If the brightness level of the IR brightness signal is higher than that of the brightness signal, the camera selecting unit 91 outputs a select signal for selecting the video camera 81 to the camera switching unit 92. If the camera selecting unit 91 is configured with hardware, a comparison may be made between the brightness signal and the IR brightness signal, for example, by using a comparator or the like.

In this embodiment, the brightness signal and the IR brightness signal are obtained respectively from the video camera 2 and the video camera 81. However, a brightness value and an IR brightness value may be obtained based on image-captured data respectively output from the video encoder 3 and the video encoder 82.

The camera switching unit 92 obtains the select signal from the camera selecting unit 91, and selects image-captured data output from either the video encoder 3 or the video encoder 82 based on the select signal. FIG. 10 illustrates one example of a configuration of the camera switching unit 92. The camera switching unit 92 illustrated in FIG. 10 is a selector for selecting image-captured data output from the video camera 2 if the select signal is 1 (S=1), or for selecting image-captured data output from the video camera 81 if S=0.

As described above, an infrared image capturing device that can shoot the target with an infrared ray is provided separately from an image capturing device, and target setting data including image data of the target, which is shot by the infrared image capturing device, position data and threshold value 2 (aspect ratio data) are recorded in the recording unit in association with a target ID for each target.

Then, a comparison is made between brightness levels (values) of images shot by the image capturing device and the infrared image capturing device, either of the image capturing devices, which implements a higher brightness level, is selected, and image-captured data shot by the selected image capturing device is output to the target detecting unit 21. If the infrared image capturing device is selected, the target detecting unit 21 obtains a target ID by using a table for the infrared image capturing device, and the target position information converting unit 24 obtains position data by using the table for the infrared image capturing device.

Operations of the mobile unit position detecting apparatus are described.

Figure 11B:
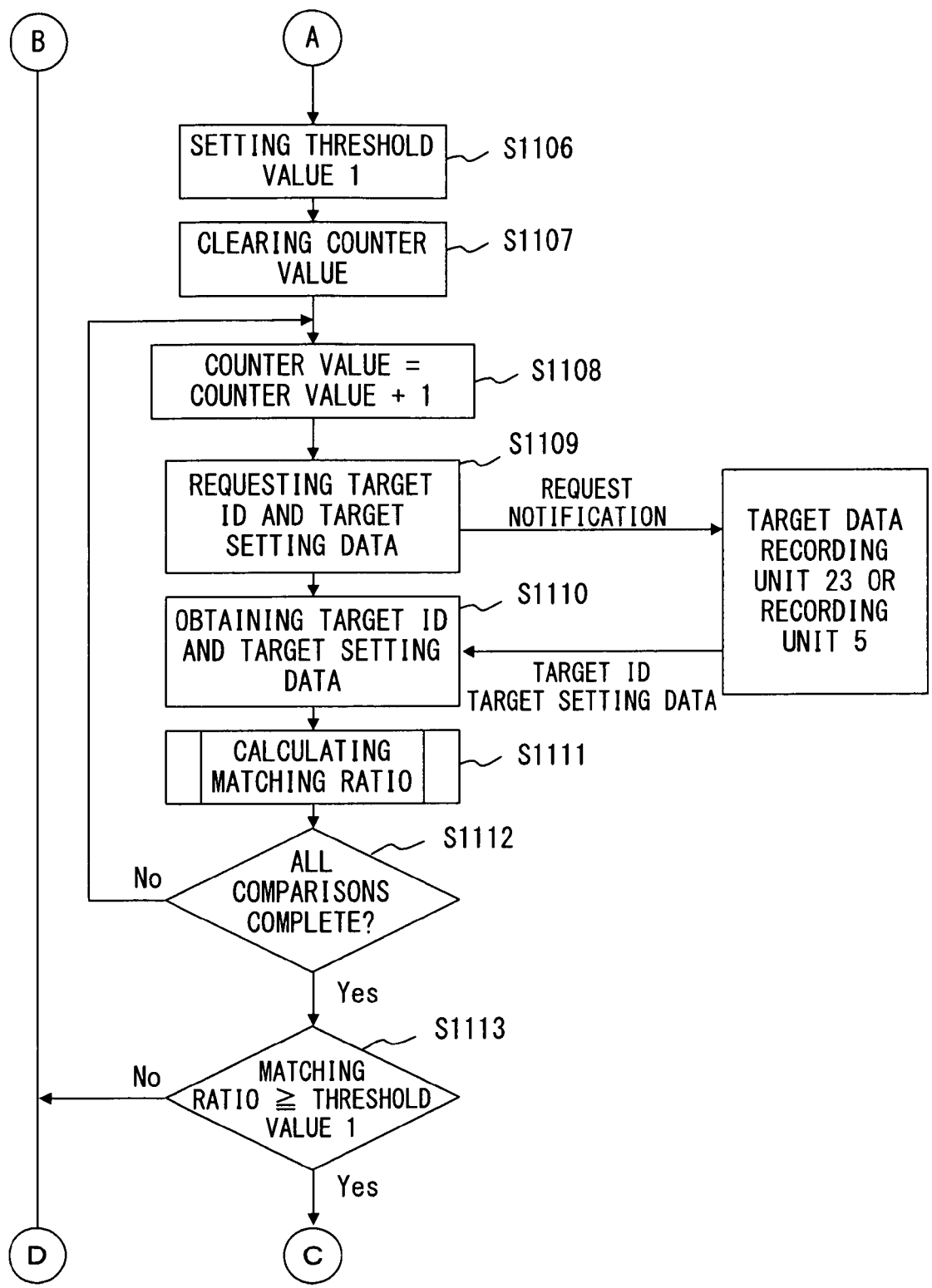
FIG. 11B is a flowchart illustrating one example of the operations of the mobile unit position detecting apparatus of the embodiment 2.
Figure 11C:
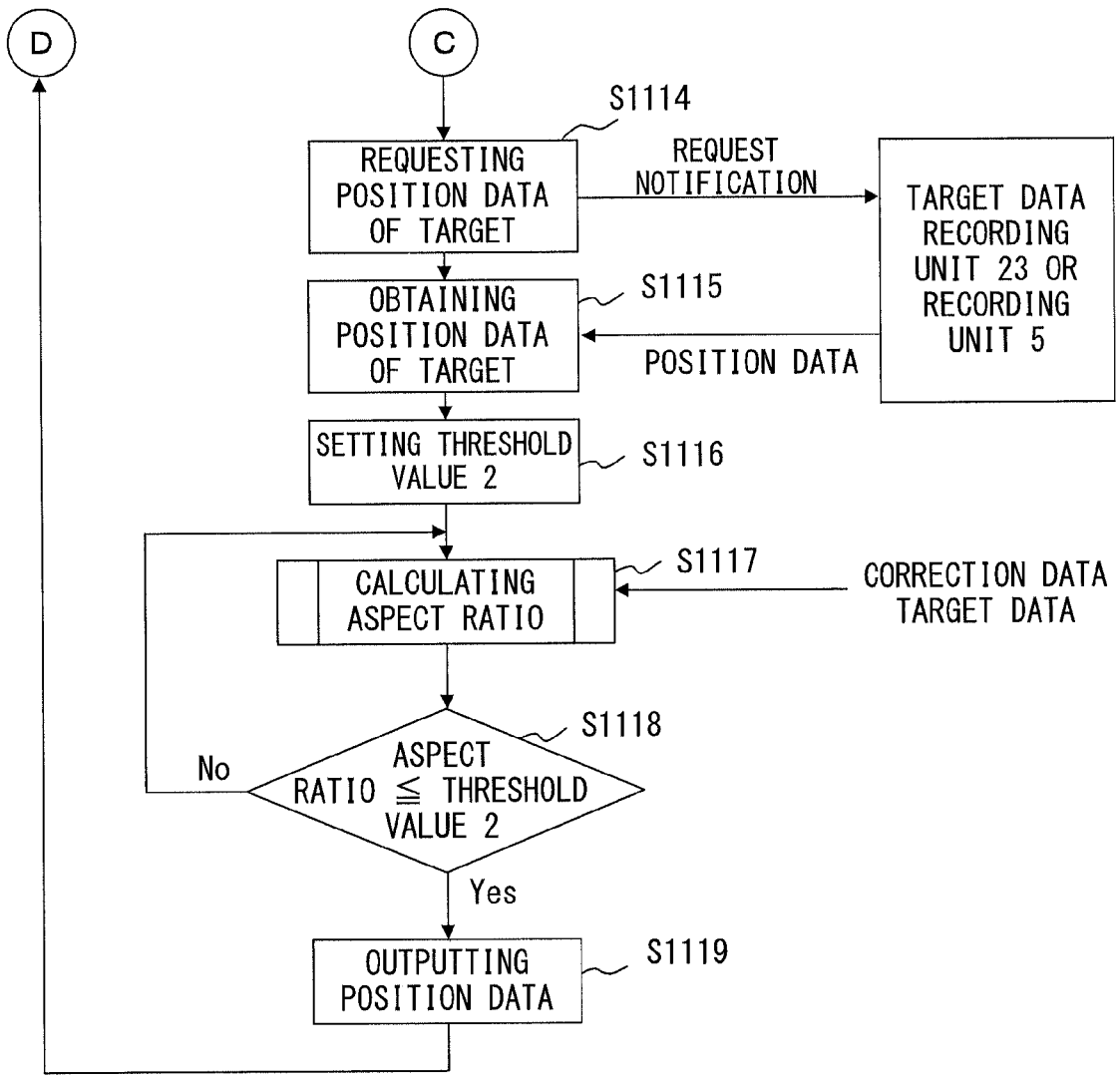
FIG. 11C is a flowchart illustrating one example of the operations of the mobile unit position detecting apparatus of the embodiment 2.

FIGS. 11A, 11B and 11C are flowcharts illustrating one example of the operations of the mobile unit position detecting apparatus.

In step S1101 (camera selection process), the camera selecting unit 91 obtains image-captured data obtained by digitally converting an image (such as an analog signal) shot by the video camera 2 with the video encoder 3, and records a brightness value included in the image-captured data. In step S1102 (camera selection process), the camera selecting unit 91 obtains image-captured data obtained by digitally converting an image (such as an analog signal) shot by the video camera 81 with the video encoder 82, and records a brightness value (IR brightness value) included in the image-captured data.

In step S1103 (camera selection process), the camera selecting unit 91 makes a comparison between the brightness value and the IR brightness value. If the brightness value is equal to or larger than the IR brightness value ("YES"), the flow goes to step S1104. If the IR brightness value is larger than the brightness value ("NO"), the flow goes to step S1105.

In step S1104 (target detection process), the target detecting unit 21 generates correction data by correcting the image-captured data, and extracts an image of a target from the correction data. Moreover, the target detecting unit 21 may extract data of an outline, a color, a pattern, a character and the like as features of the target after extracting the image of the target.

In step S1105 (target detection process), the target detecting unit 21 generates correction data by correcting the image-captured data shot by the video camera 81, and extracts the image of the target from the correction data. Moreover, the target detecting unit 27 may extract data of an outline, a color, a pattern, a character and, the like as features of the target after extracting the image of the target.

Operations in steps S1108 to S1119 when the flow branches to step S1104 are identical to those in steps S2 to S15 of FIGS. 7A and 7B described in the embodiment 1. However, the operations in steps S1108 to S1119 when the flow branches to step S1105 are different from those of the embodiment 1. If the flow branches to step S1105, a target table for data shot by the video camera 81, which is different from the target table illustrated in FIG. 4, is used.

FIG. 12 illustrates one example of a structure of the target table used in the embodiment 2.

In the embodiment 2, the target table (IR target table) for data shot by the video camera 81 is provided separately from the target table illustrated in FIG. 4. The IR target table is used when the side of the video camera 81 is selected by the camera selecting unit 91. The IR target table includes columns "target ID", "IR target setting data", "threshold value 2 (aspect ratio data)" and "position data", which respectively record a target ID, IR target setting data, a threshold value 2 (aspect ratio data) and position data. For "target ID", an identification number associated with each target is recorded in a corresponding portion in a similar manner as in the first embodiment. In this example, numerals "1", "2", . . . , "N" are assigned. In the IR target setting data, image data, an outline, a color, a pattern, a written character and the like of a target, shot by an infrared camera are recorded. In FIG. 12, "IR target setting data" includes columns "IR image data", "IR outline data", "IR color data", "IR pattern data" and "IR character data", which respectively record data of an image shot by an infrared camera, an outline, a color, a pattern and a character.

For the image data of the target, a name for linking to image data of a target shot in advance is recorded in a portion corresponding to "IR image data" in association with a target ID. For example, the name of a file where the IR image data is recorded is recorded. In this example, "IR image 1", "IR image 2", . . . , "IR image n" are assigned.

In a portion corresponding to "IR outline data", a name for linking to a name of a file where data of an outline of a target, which is extracted from the target with an image process such as outline extraction or the like, is recorded is recorded in association with a target ID. In this example, "IR outline 1", "IR outline 2", . . . , "IR outline n" are assigned.

In a portion corresponding to "IR color data", a name for linking to a name of a file where data of a color (or hue) of a target, which is extracted from the target with an image process, is recorded is recorded in association with a target ID. In this example, "IR color 1", "IR color 2", . . . , "IR color n" are assigned.

In a portion corresponding to "IR pattern data", a name for linking to a name of a file where data of a pattern of a target, which is extracted from the target with an image process, is recorded is recorded in association with a target ID. In this embodiment, "IR pattern 1", "IR pattern 2", . . . , "IR pattern n" are assigned.

In a portion corresponding to "IR character data", a name for linking to a name of a file where data of a character written in a target, which is extracted from the target with an image process, is recorded is recorded in association with a target ID. In this example, "IR character 1", "IR character 2", . . . , "IR character n" are assigned.

"threshold value 2 (aspect ratio data)" and "position data" are recorded in association with a target ID as described in the embodiment 1.

Note that "threshold value 2" and "position data", which are illustrated in FIG. 12, are available in common as "threshold value 2" and "position data" in the target table for video camera 2 (FIG. 4).

As described above, by switching and using between the infrared camera and the visible ray camera depending on a brightness level, image identification performance can be prevented from being degraded even at nighttime (or in the bad weather). Therefore, highly reliable position detection can be implemented at any time of day or night.

Additionally, a detection ratio of a target can be improved by irradiating an infrared ray from a mobile unit to the target after coating an infrared retro-reflective material on the target in order to facilitate the detection of a shape and features of the target. For example, an infrared retro-reflective material may be coated on the whole or an outer perimeter of the target in order to facilitate the identification of the shape of the target.

An embodiment 3 is described.

Since a field angle (or a view angle) of an image capturing device stationary in a mobile unit is finite, the field angle is forcibly narrowed in some cases so as to perform valid image recognition while a mobile unit is moving. However, if the field angle is narrowed, it becomes difficult to detect a target in a shot image.

The embodiment 3 refers to a method of detecting a position of a mobile unit with high reliability by detecting a target even if the target that needs a wide field angle exists.

FIG. 13 is a block diagram illustrating one example of a configuration of a mobile unit position detecting apparatus in the embodiment 3.

The mobile unit position detecting apparatus 1300 in the embodiment 3 includes the video camera 2 (a first video camera in FIG. 13), the video encoder 3, a second video camera 1301, a video encoder 1302, the controlling unit 4 and the recording unit. In the embodiment 3, the mobile unit position detecting apparatus 1300 is implemented by adding the second video camera 1301 having shooting performance equivalent to the first video camera 2 except for an image capturing range, and the video encoder 1302 having performance equivalent to the video encoder 3 to the configuration of the embodiment 1. The second video camera 1301 and the video encoder 1032 may not always be equivalent to the video camera 2 and the video encoder 3. Any camera and encoder may be available as long as they can obtain image-captured data that can be synthesized in an image synthesis to be described later.

Additionally, the first video camera 2 and the second video camera 1301 are installed so that a common portion is included in shot images although their shooting ranges are different.

Furthermore, the embodiment 2 refers to a case of using two image capturing devices. However, two or more image capturing device may be prepared.

Figure 14:
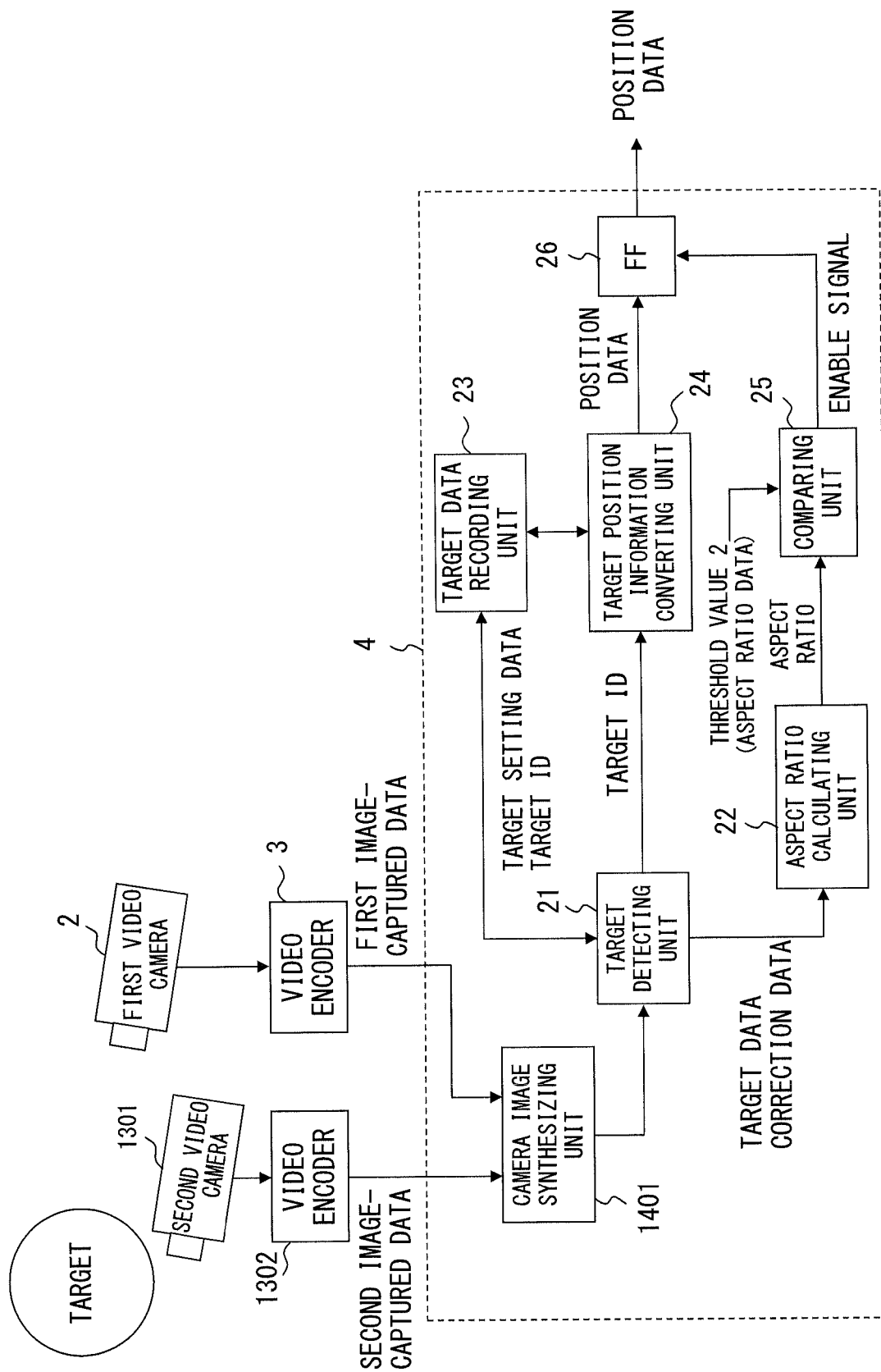
FIG. 14 is a block diagram illustrating one example of a configuration of a controlling unit in the embodiment 3.

FIG. 14 is a block diagram illustrating one example of a configuration of the controlling unit in the embodiment 3.

The controlling unit 4 includes the target detecting unit 21, the aspect ratio calculating unit 22, the target data recording unit 23, the target position information converting unit 24, the comparing unit 25, the FF 26 (data storing unit, for example, flip-flop) and a camera image synthesizing unit 1401.

The camera image synthesizing unit 1401 obtains images shot by the first video camera 2 and the second video camera 1301 at the same time. The image shot by first the video camera 2 is obtained as first image-captured data via the video encoder 3, whereas the image shot by the second video camera 1301 is obtained as second image-captured data via the video encoder 1302. Next, the camera image synthesizing unit 1401 synthesizes the first image-captured data and the second image-captured data.

FIG. 15 illustrates one example where the camera image synthesizing unit, 1401 generates a synthesis image by synthesizing the fist image-captured data and the second image-captured data. This example refers to a case where the first image-captured data does not include a broken-line range 1501 and the second image-captured data does not include a broken-line range 1502. In the example of FIG. 15, a portion where a pixel sequence is the same is detected, for example, by making a comparison between pixels that configure the first image-captured data and the second image-captured data, and the detected portion is recorded as a common portion. In the example of FIG. 15, the camera image synthesizing unit 1401 records, in the recording unit 5, a broken-line range 1503 of the first image-captured data and a broken-line range 1504 of the second image-captured data as common portions. Next, the camera image synthesizing unit 1401 generates a synthesis image by synthesizing the first image-captured data and the second image-captured data so that the broken-line range 1503 and the broken-line range 1504 as the common portions overlap. Then, the camera image synthesizing unit 1401 records the synthesis image in the recording unit 5. Thereafter, the camera image synthesizing unit 1401 outputs data of the synthesis image to the target detecting unit 21. It is desirable that the synthesis of the first image-captured data and the second image-captured data should be performed within a frame signal cycle after synchronizing frame signals of the first image-captured data and the second image-captured data.

In the above described example, two images are synthesized by searching for a common portion. However, the generation of a synthesis image is not limited to the method of searching for and synthesizing common portions. Any method is available as long as a plurality of images can be synthesized.

Operations of the mobile unit position detecting apparatus are described.

Figure 16A:
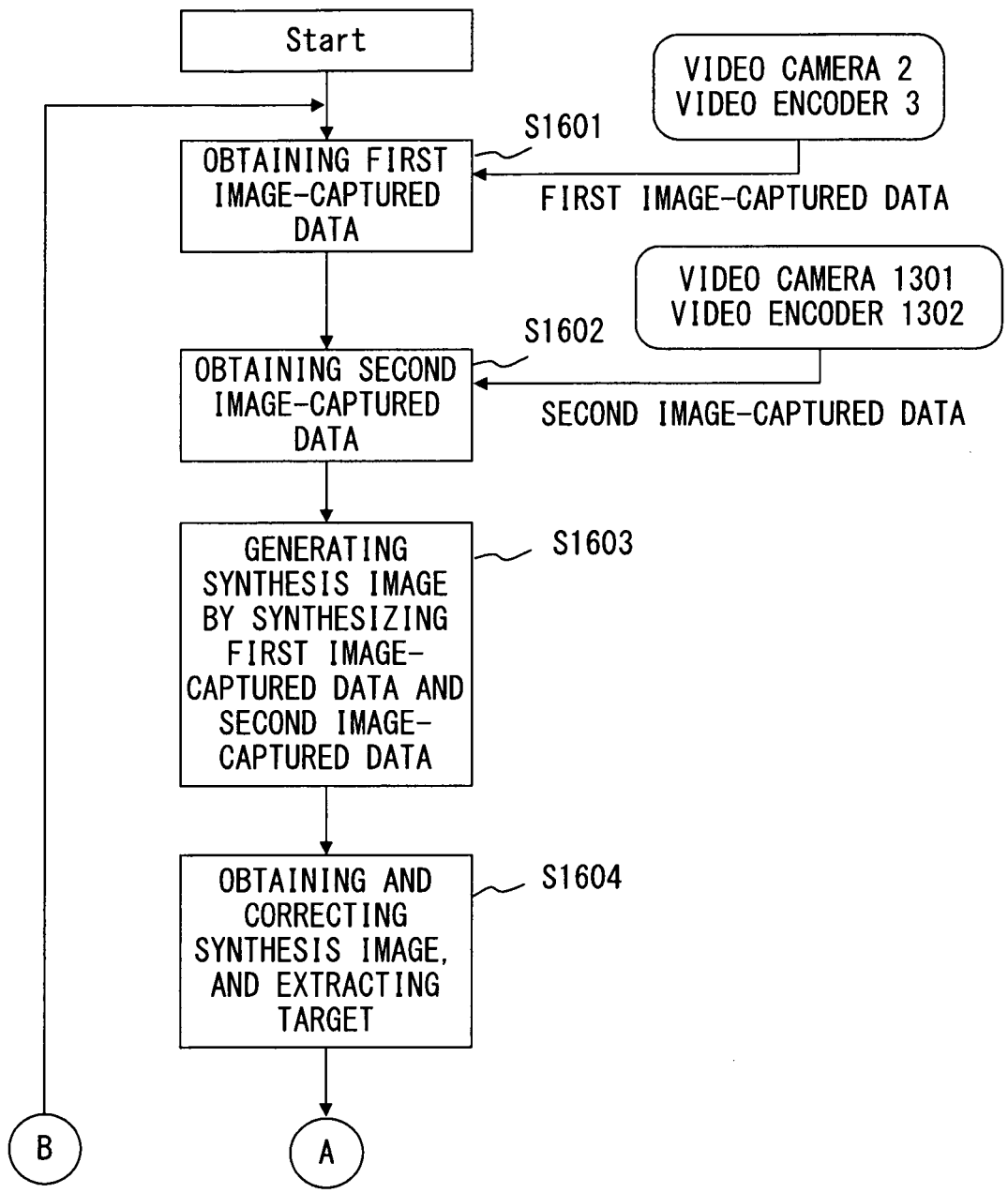
FIG. 16A is a flowchart illustrating one example of operations of the mobile unit position detecting apparatus of the embodiment 3.
Figure 16B:
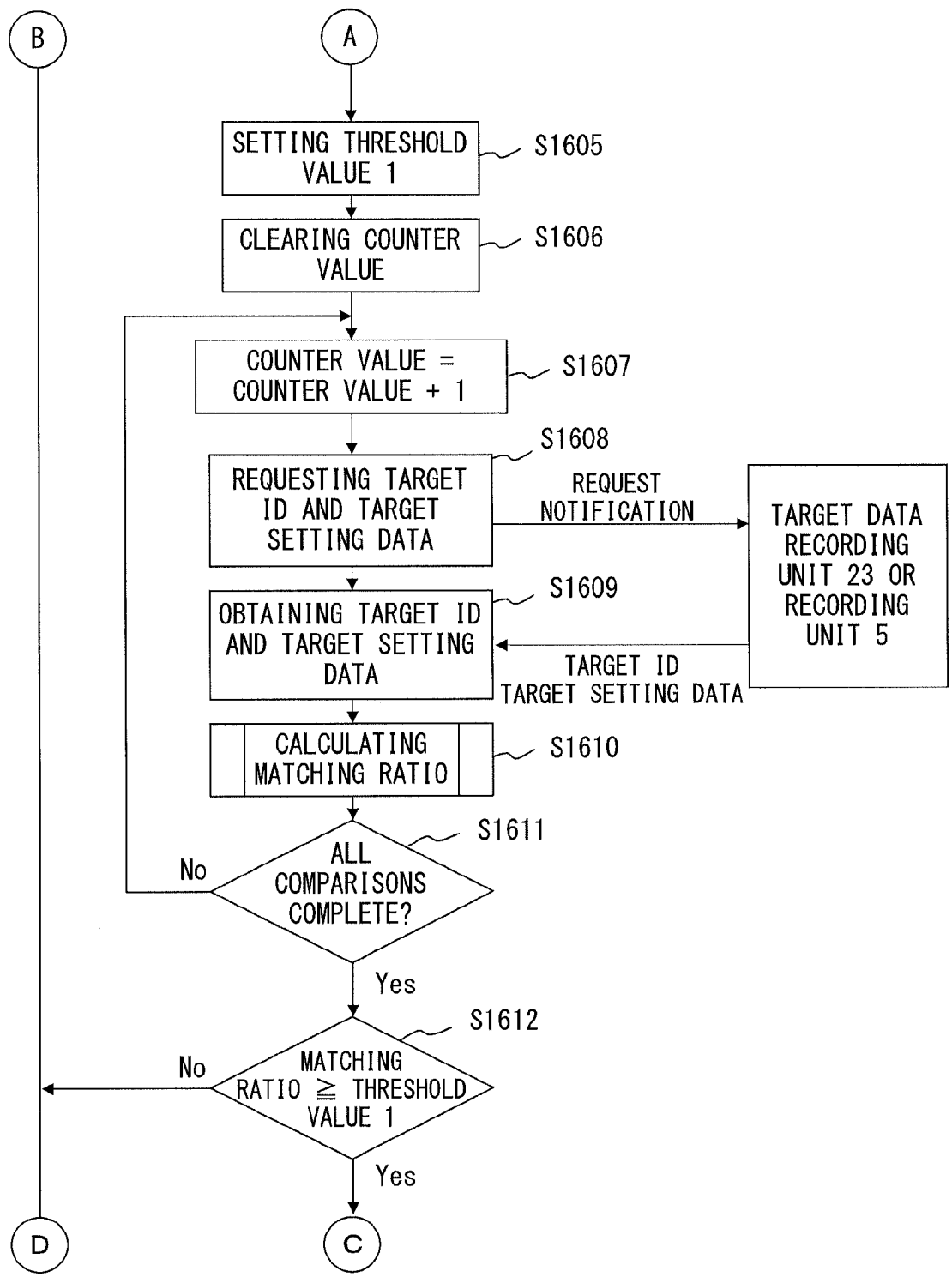
FIG. 16B is a flowchart illustrating one example of the operations of the mobile unit position detecting apparatus of the embodiment 3.
Figure 16C:
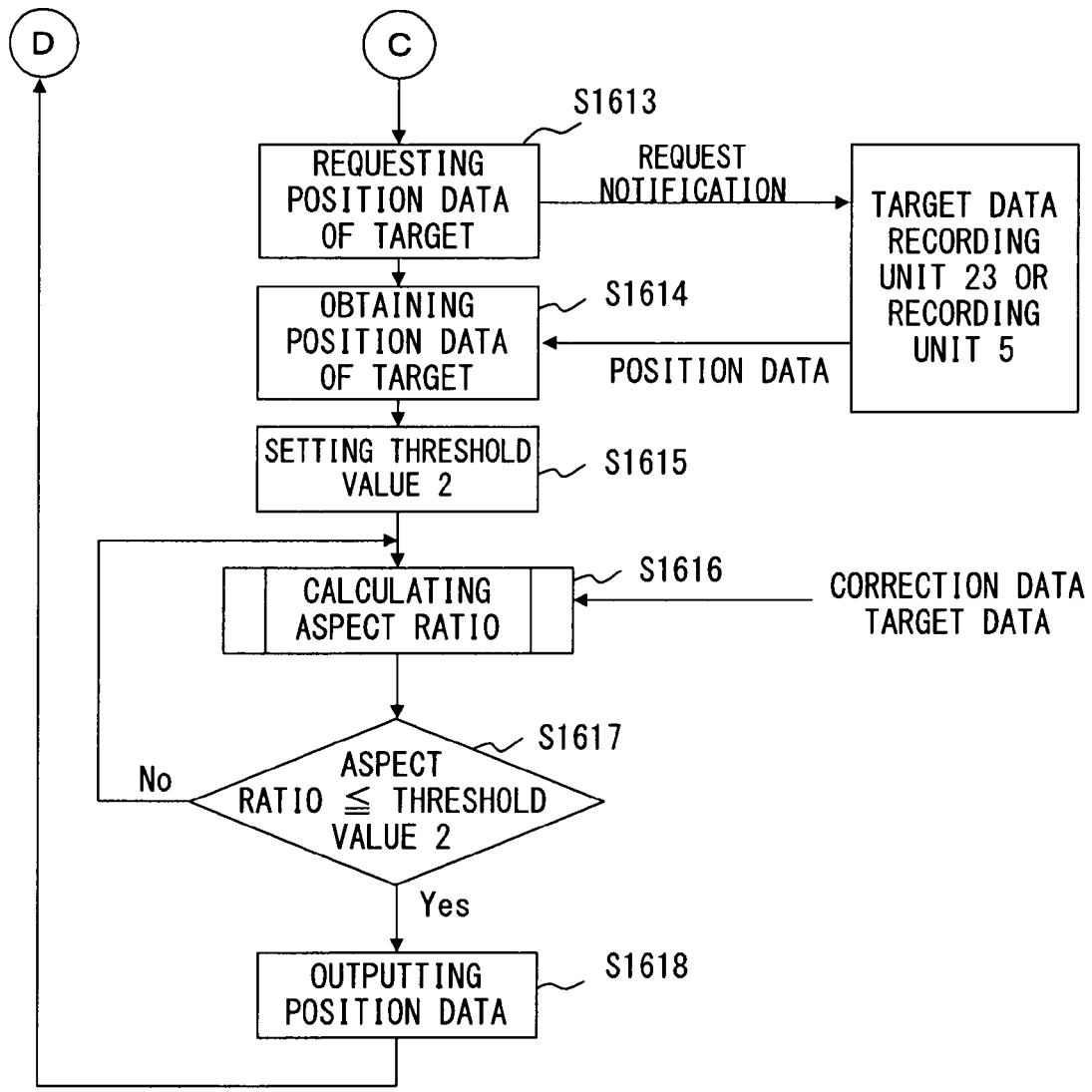
FIG. 16C is a flowchart illustrating one example of the operations of the mobile unit position detecting apparatus of the embodiment 3.

FIGS. 16A, 16B and 16C are flowcharts illustrating one example of the operations of the mobile unit position detecting apparatus.

In step S1601 (camera image synthesis process), the camera image synthesizing unit 1401 obtains image-captured data by digitally converting an image (such as an analog signal) shot by the video camera 2 with the video encoder 3. In step S1602 (camera image synthesis process), the camera image synthesizing unit 1401 obtains image-captured data obtained by digitally converting an image (such as an analog signal) shot by the second video camera 1301 with the video encoder 1302.

In step S1603 (camera image synthesis process), the camera image synthesizing unit 1401 searches for common portions of the images of the first image-captured data and the second image-captured data, and generates a synthesis image by synthesizing the images of the first image-captured data and the second image-captured data so that the common portions overlap. Thereafter, the camera image synthesizing unit 1401 records the synthesis image in the recording unit 5.

In step S1604 (target detection process), the target detecting unit 21 generates correction data by correcting the synthesis image, and extracts an image of a target from the correction data. Alternatively, the target detecting unit 21 may extract data of an outline, a color, a pattern, a character and the like as features of the target after extracting the image of the target.

Operations in steps S1605 to S1618 are identical to those of steps S2 to S15 of FIGS. 7A and 7B described in the embodiment 1.

As described above, the second image capturing device for shooting a shooting range that is different from and partially common to the shooting range of the first image capturing device is provided separately from the first image capturing device. Then, a synthesis image is generated by synthesizing image-captured data shot by the first image capturing device and the second image capturing device so that common portions overlap, and the generated image is output to the target detecting unit.

Namely, even if a field angle is narrowed due to a move of a mobile unit, a plurality of pieces of image-captured data are shot by a plurality of image capturing devices installed at different angles in order to make up for lack of the field angle, and a synthesis image is generated by synthesizing the plurality of pieces of image-captured data. As a result, the detection accuracy of a target can be improved. Moreover, highly reliable position detection can be implemented with high precision.

An embodiment 4 is described.

With a method by which a mobile unit side records position information of an existing target in advance and the mobile unit identifies its position by aiming at the object, the installation position of the target needs to be recorded in advance. Therefore, also the amount of information recorded in a recording unit included in the mobile unit becomes very large if the number of targets becomes huge. Accordingly, the embodiment 4 refers to a method of reducing the amount of information recorded in the recording unit included in the mobile unit.

A mobile unit position detecting apparatus of the embodiment 4 has the same configuration as that of the embodiment 1, and includes the video camera 2, the video encoder 3, the controlling unit 4 and the recording unit 5.

Figure 17:
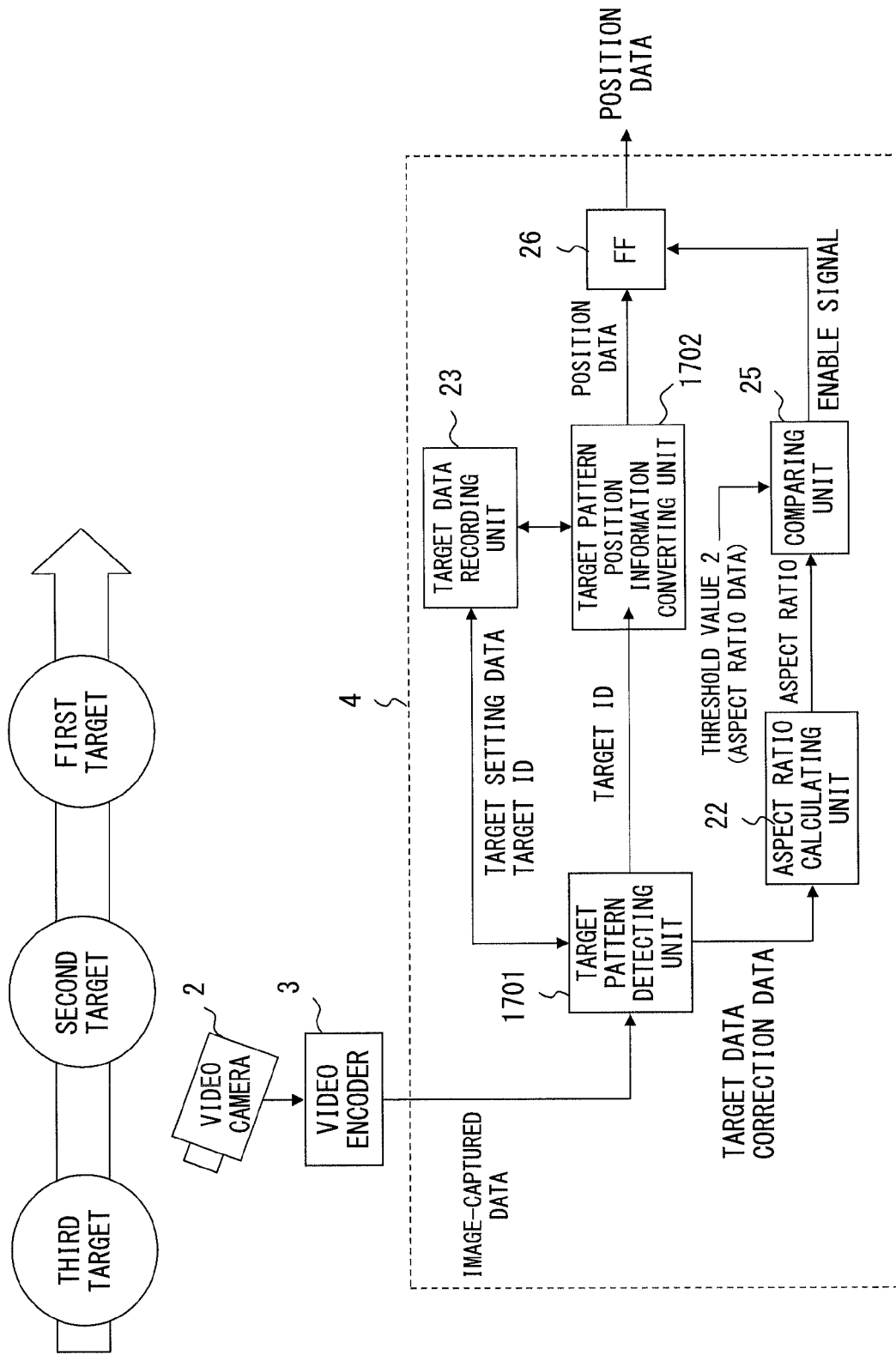
FIG. 17 is a block diagram illustrating one example of a configuration of a controlling unit in an embodiment 4.

FIG. 17 is a block diagram illustrating one example of a configuration of the controlling unit in the embodiment 4.

The controlling unit 4 includes the target pattern detecting unit 1701, the aspect ratio calculating unit 22, the target data recording unit, 23, a target pattern position information converting unit 1702, the comparing unit 25 and the FF 26 (data storing unit, for example, flip-flop).

Similarly to the target detecting unit 21, the target pattern detecting unit 1701 obtains image-captured data from the video encoder 3, and obtains a matching ratio between target data included in the image-captured data and target setting data prerecorded in the target data recording unit 23. Next, similarly to the target detecting unit 21, the target pattern detecting unit 1701 detects target setting data having the highest correlation with a target in the shot image. Then, the target pattern detecting unit 1701 obtains a target ID prerecorded in the target data recording unit 23 in association with the target setting data. Thus obtained target IDs are recorded in an order of catching the targets as illustrated in FIG. 18, and a pattern that matches target IDs recorded in the target table illustrated in FIG. 19 is detected. Upon detecting the matching pattern, the target pattern detecting unit 1701 outputs the last target ID in the matching pattern to the target pattern position information converting unit 1702.

For example, if a target ID of the first target caught in FIG. 17 is "1", "1" is recorded in a first ID_1801a illustrated in FIG. 18. Next, if a target ID of the second target caught in FIG. 17 is "2", "2" is recorded in a second ID_1801b illustrated in FIG. 18. Then, if a target ID of the third target caught in FIG. 17 is "3", "3" is recorded in a third ID_1801c illustrated in FIG. 18.

Next, if it is searched whether or not a pattern "123" of the target IDs recorded in the order of catching two IDs as described above exists among the target IDs illustrated in FIG. 19, "123" that matches the pattern "123" is found. Next, "3" that is the target ID obtained last is output to the target pattern position information converting unit 1702.

Upon obtaining a target ID, the target pattern position information converting unit 1702 determines whether or not there is position data corresponding to the target ID by referencing the target table illustrated in FIG. 19, and outputs position data to FF 26 only if there is the corresponding position data.

The target table of FIG. 19 is described.

In a portion of "target ID", the target IDs that are respectively assigned to sequentially installed targets are recorded in an order of catching the targets (target pattern). In "target setting data", "image data", "outline data", "color data", "pattern data" and "character data" are recorded in their corresponding columns in association with each target ID in a similar manner as in the target table used in the embodiments 1 to 3.

Additionally, in "threshold value 2", "ratio" is recorded in association with only a target ID in the last row of a pattern recorded in "target ID".

In "position data", position data is recorded in association with only a target ID in the last row of a pattern recorded in "target ID". Namely, the position data is updated when a mobile unit approaches the last target.

Operations of the mobile unit position detecting apparatus are described.

Figure 20A:
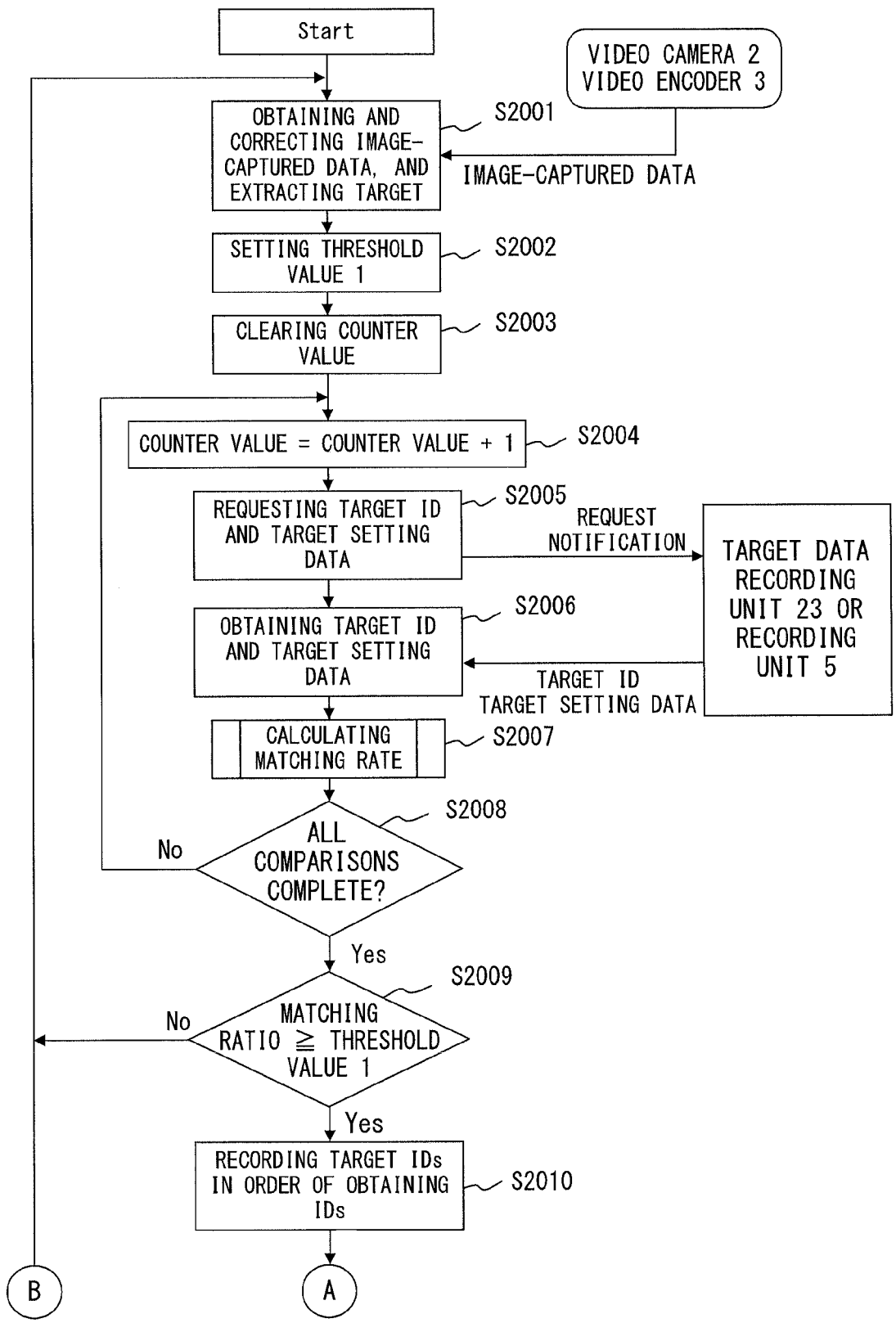
FIG. 20A is a flowchart illustrating one example of operations of the mobile unit position detecting apparatus of the embodiment 4.
Figure 20B:
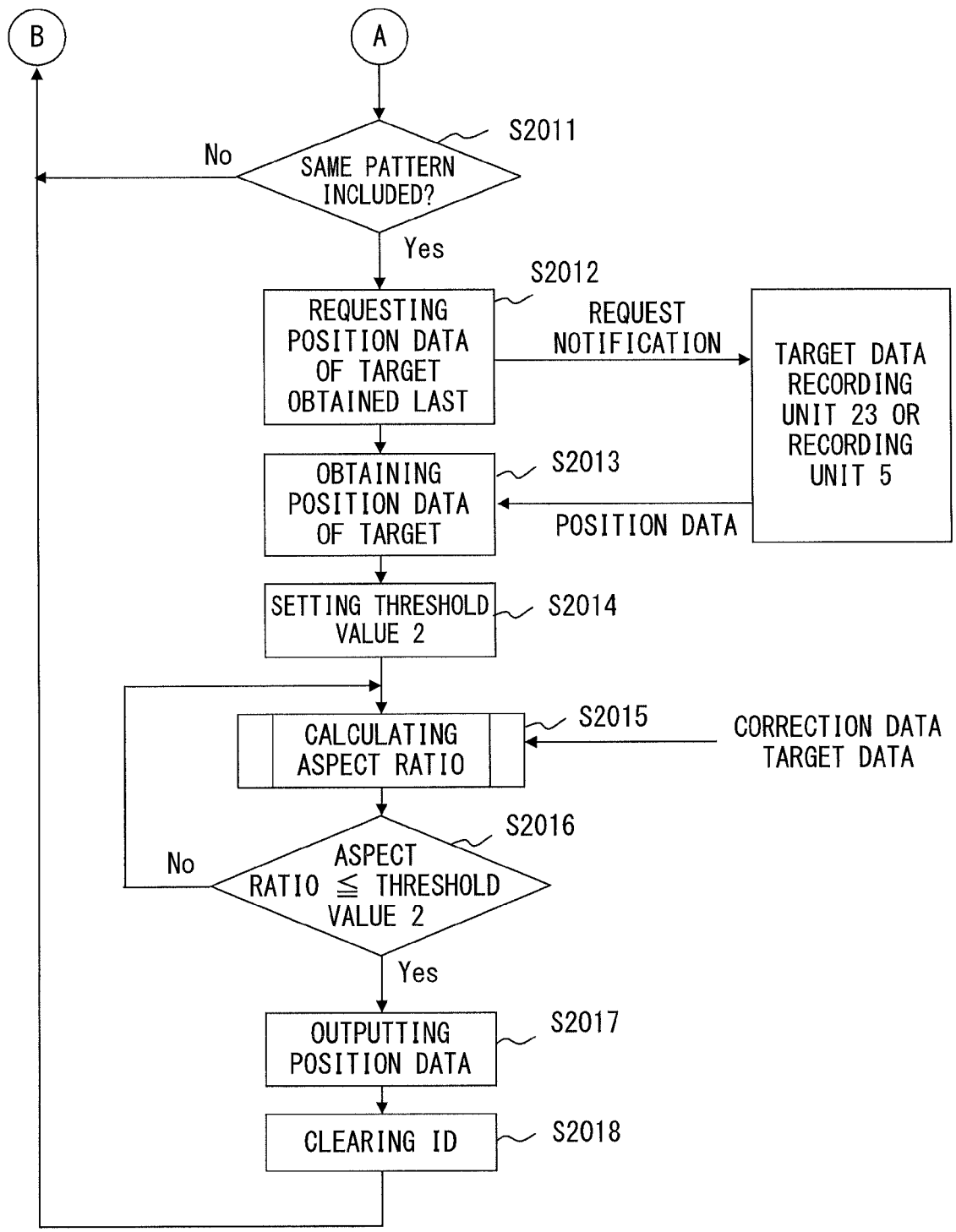
FIG. 20B is a flowchart illustrating one example of the operations of the mobile unit position detecting apparatus of the embodiment 4.

FIGS. 20A and 20B are flowcharts illustrating one example of the mobile unit position detecting apparatus.

Operations in steps S2001 to S2009 (target pattern detection process) are identical to those of steps S1 to S9 of FIG. 7A described in the embodiment 1.

In step S2010 (target pattern detection process), the target pattern detecting unit 1701 generates a pattern by recording target IDs in an order of obtaining the IDs.

In step S2011 (target pattern detection process), the target pattern detecting unit 1701 searches whether or not there is the same pattern by referencing the target table illustrated in FIG. 19. If there is the same pattern, the flow goes to step S2012. If there is not the same pattern, the flow goes back to step S2001. For example, if there is not a pattern "12" among the target IDs in the target table although the pattern "12" is generated by the target pattern detecting unit 1701, the flow goes back to step S2001. Additionally, if the target ID "3" is not detected despite an elapse of a predetermined time period although the target IDs "12" in the pattern are detected, position information by GPS or the like is obtained, and it is determined whether or not a mobile unit has already passed the position of the target, which corresponds to the target ID "3". If the mobile unit has already passed the position of the target, which corresponds to the target ID "3", the generated pattern "12" is deleted. Then, the flow goes back to step S2001.

In step S2012 (target pattern position information conversion process), the target pattern detecting unit 1701 transmits, to the recording unit 5 (or the target data recording unit 23), a target ID obtained last when generating the pattern along with a request notification of position data.

Next, upon obtaining the request notification, the recording unit 5 (or the target data recording unit 23) detects the position data associated with the target ID from the target table, and outputs the detected data to the target detecting unit 21.

In step S2013 (target pattern position information conversion process), the target position information converting unit 24 obtains the position data output from the recording unit 5 (or the target data recording unit 23).

Operations in steps S2014 to S2017 (aspect ratio calculation process) are identical to those of steps S12 to S15 of FIG. 7B described in the embodiment 1.

In step S2018, when the FF 26 outputs the position data, the target pattern detecting unit 1701 deletes the generated pattern. Then, the flow goes back to step S2001.

As described above, a target ID corresponding to a target captured last in a detected pattern is obtained, and position data associated with a target ID corresponding to the target caught last is detected from the recording unit.

Namely, not position data of each target but patterns of a particular number of targets are stored in the recording unit, and a pattern and position data of a point where the pattern exists are linked and stored, whereby the scale of the recording unit included in a mobile unit can be reduced.

An embodiment 5 is described.

In the above described embodiments 1 to 4, if there are a plurality of objects having a shape, a color or a pattern similar to that of a target expect for the target in an image shot by the video camera, it becomes difficult to identify the target. Therefore, this embodiment refers to a position detecting method by which a target can be identified even if there are a plurality of objects having a shape, a color or a pattern similar to that of the target except for the target.

For example, the same configuration as that of the mobile unit position detecting apparatus of FIG. 8 described in the embodiment 2 can be used as a configuration of a mobile unit position detecting apparatus in the embodiment 5. Accordingly, the embodiment 5 refers to the mobile unit position detecting apparatus including the video camera 2, the video encoder 3, the video camera 81 (infrared video camera), the video encoder 82, the controlling unit 4 and the recording unit 5 as one example.

The embodiment 5 assumes that position information is, for example, painted or printed on a target as indicated by A of FIG. 22 to be described later. For example, a target identification number or position coordinates (position information) is painted or printed on the target as the position information by using an infrared-shielding paint. Alternatively, the position information may be buried in the target with print-type steganography.

Figure 21:
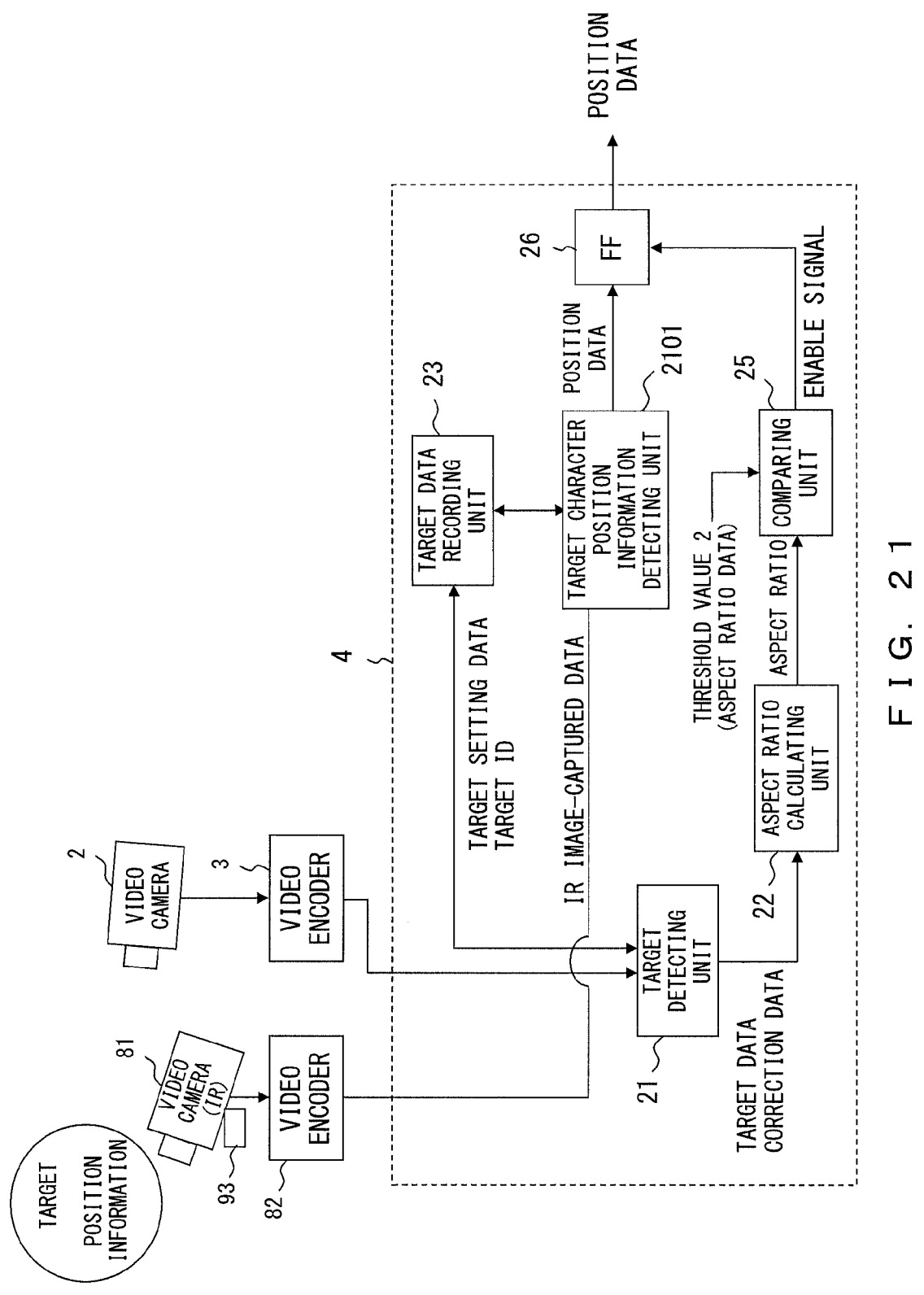

FIG. 21 is a block diagram illustrating one example of a configuration of the controlling unit in the embodiment 5.

The controlling unit 4 includes the target detecting unit 21, the aspect ratio calculating unit 22, the target data recording unit 23, the comparing unit 25, the FF 26 (data storing unit, for example, flip-flop) and a target character position information detecting unit 2101.

Figure 22:
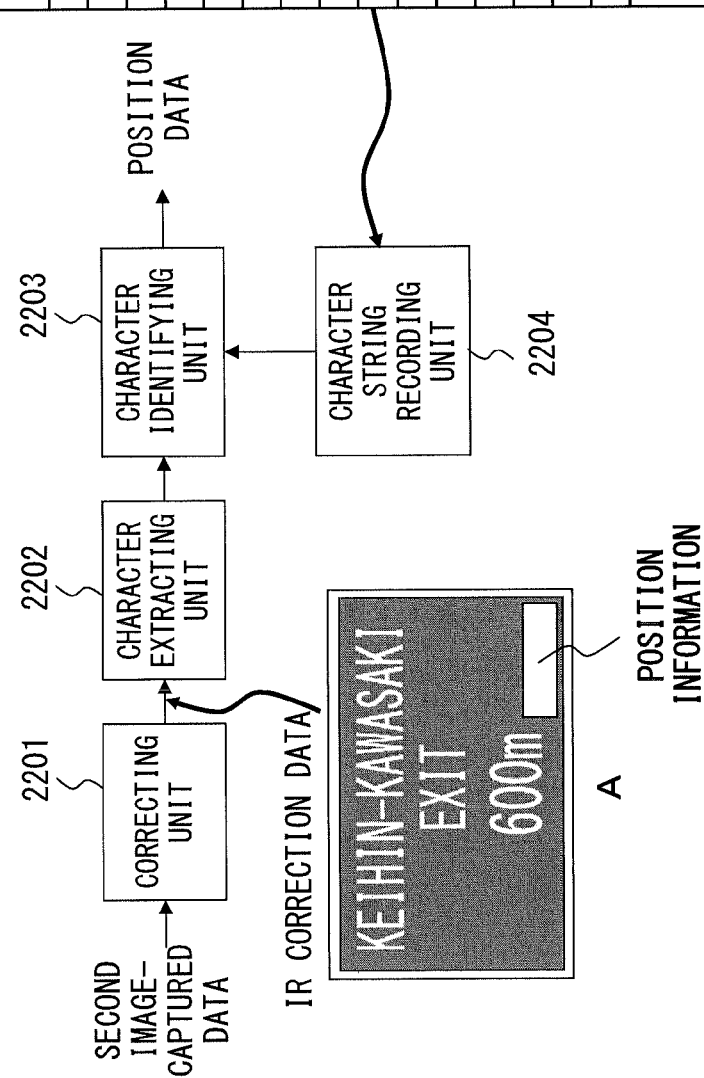
FIG. 22 is a block diagram illustrating one example of a configuration of a character position information detecting unit of the embodiment 5.

The target character position information detecting unit 2101 includes a correcting unit 2201, a character extracting unit 2202, a character identifying unit 2203 and a character string recording unit 2204 as represented by a block diagram of FIG. 22.

The correcting unit 2201 obtains second image-captured data shot by the video camera 81, corrects the shot image with an existing technique, and outputs IR correction data to the character extracting unit 2202. For example, the correcting unit 2201 performs a contrast or brightness correction, a correction for making an image sharp with a filter, and a correction to a tilt of the image. Note that a distortion aberration, vignetting, lack of sharpness, chromatic aberration of magnification, a colored fringe and the like may be corrected, or corrections such as exposure optimization, backlight correction, noise removal and the like may be performed. Note that the above described corrections may not always be performed.

The character extracting unit 2202 extracts position information written in the IR correction data (A of FIG. 22) with an existing character recognition technique. Next, the character identifying unit 2203 searches whether or not a character string extracted by the character extracting unit 2202 matches any of character strings recorded in the character string recording unit 2204. If a matching character string is found, position data associated with the matching character string is output to the FF 26.

In the character string recording unit 2204, a character string/position data conversion table illustrated in B of FIG. 22 is recorded. The character string/position data conversion table includes columns "character string data" and "position data", which respectively record a character string recorded for each target and position data that indicates the position of each target. In this example, "character string data 1", "character string data 2", ..., "character string data n" are recorded as the position information of each target in the column "character string data". Moreover, position data corresponding to each piece of the character string data is recorded in the column "position data". Note that the character string recording unit 2204 may be provided in the recording unit 5.

Operations of the mobile unit position detecting apparatus are described.

Figure 23A:
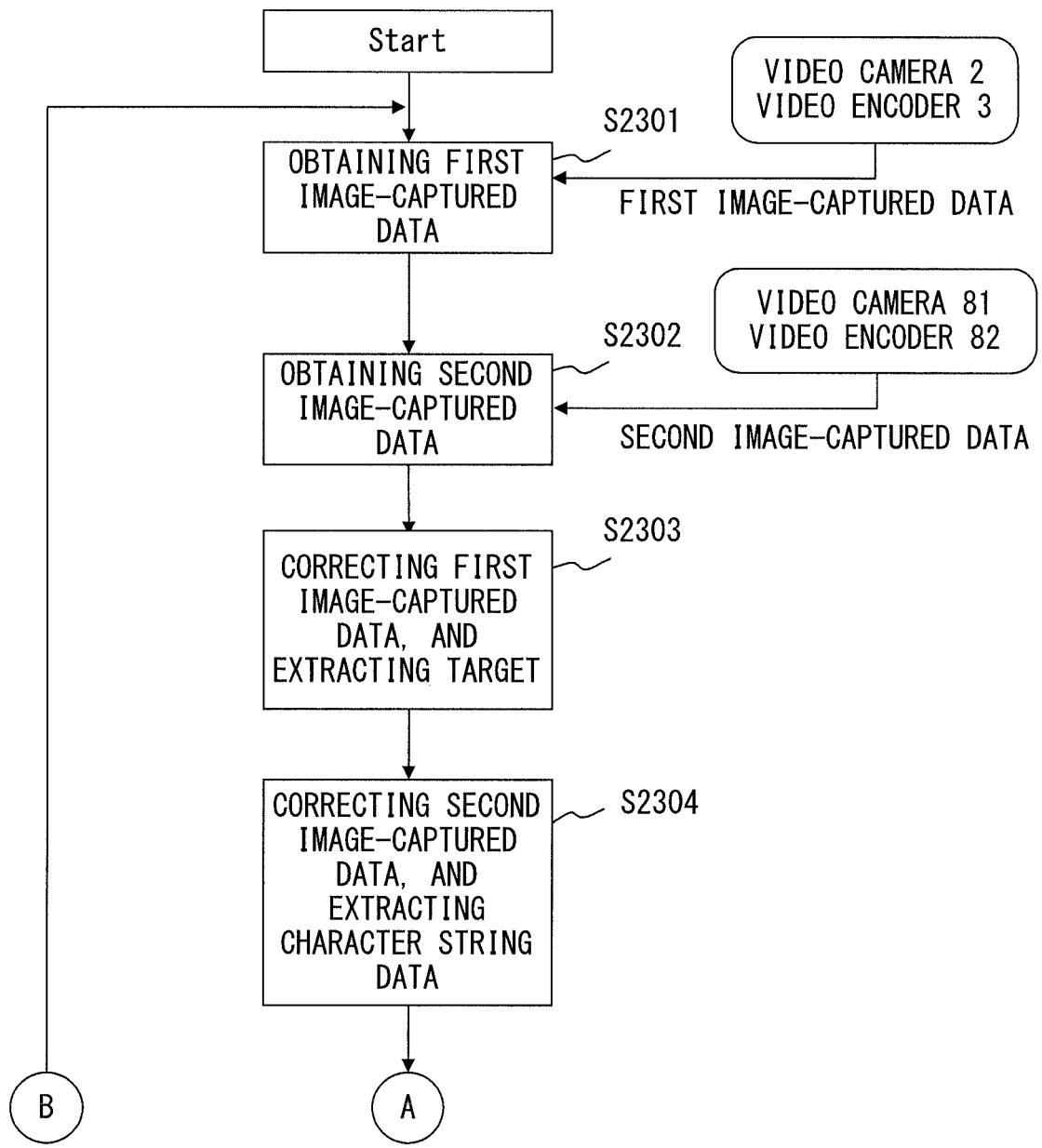
FIG. 23A is a flowchart illustrating one example of operations of a mobile unit detecting apparatus of the embodiment 5.
Figure 23B:
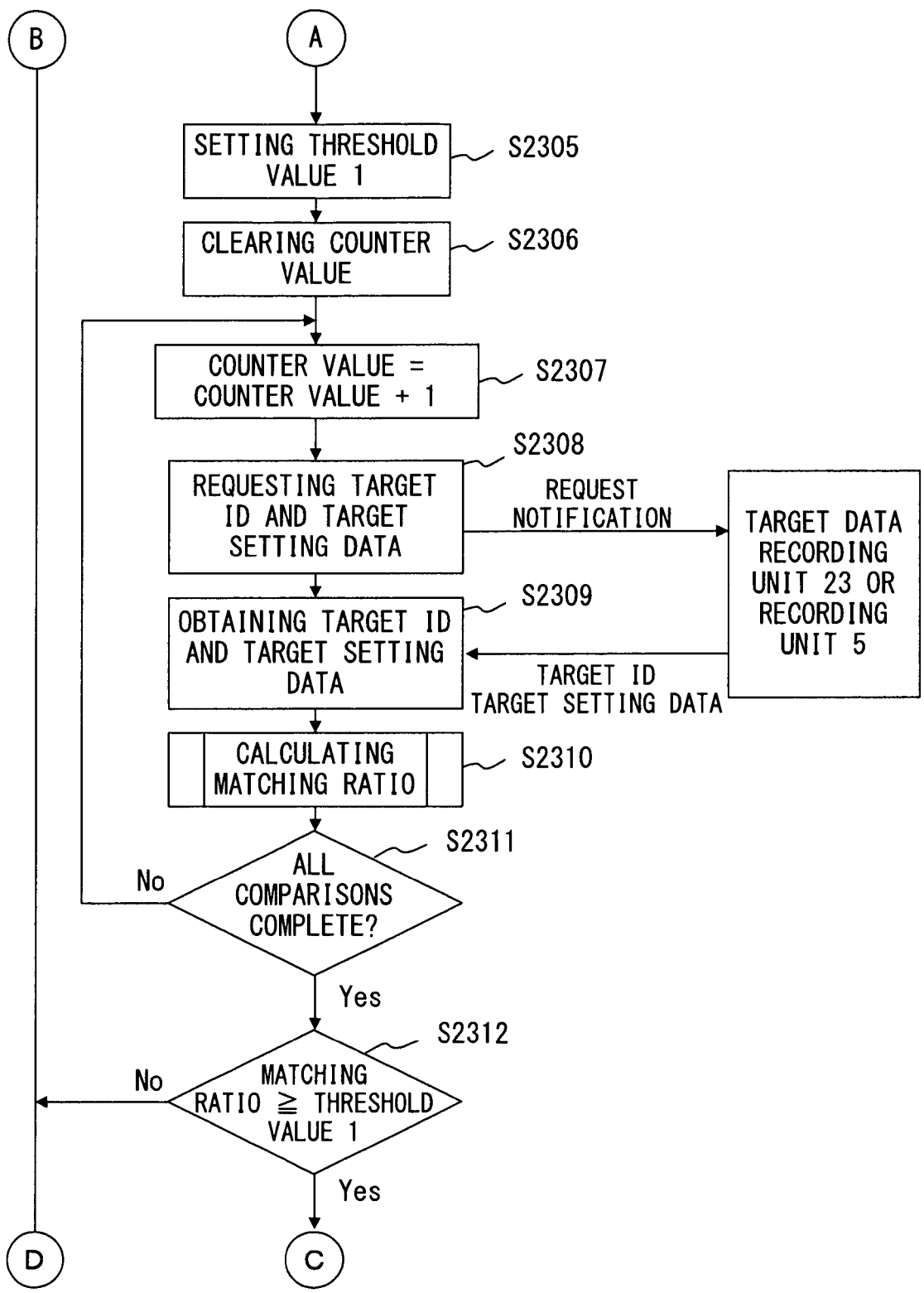
FIG. 23B is a flowchart illustrating one example of the operations of the mobile unit detecting apparatus of the embodiment 5.
Figure 23C:
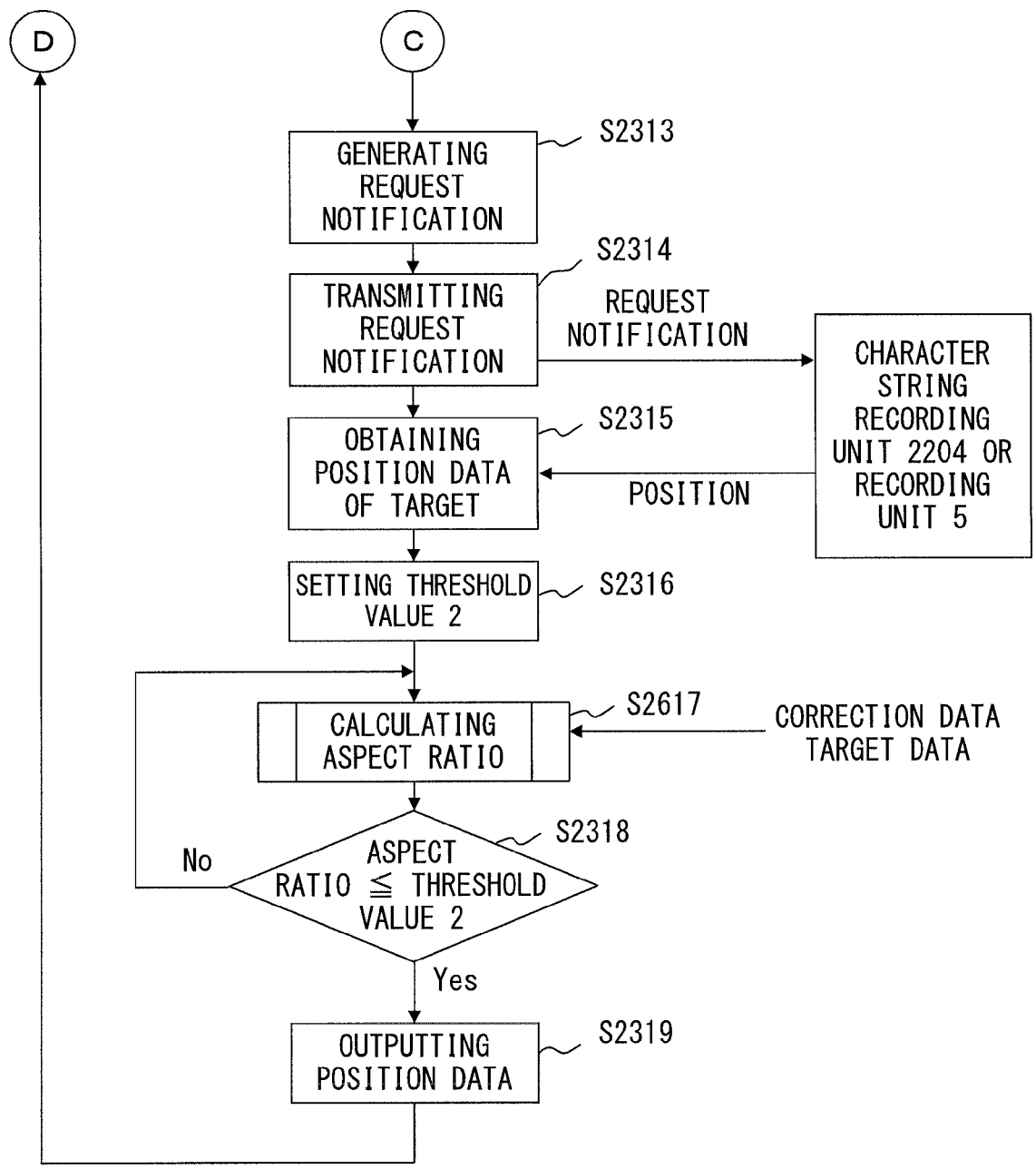
FIG. 23C is a flowchart illustrating one example of the operations of the mobile unit detecting apparatus of the embodiment 5.

FIGS. 23A, 23B and 23C are flowcharts illustrating one example of the operations of the mobile unit position detecting apparatus.

In step S2301 (target detection process), the target detecting unit 21 obtains first image-captured data obtained by digitally converting an image (such as an analog signal) shot by the video camera 2 with the video encoder 3. In step S2302 (character position information detection process), the target character position information detecting unit 2101 obtains second image-captured data obtained by digitally converting an image (such as an analog signal) shot by the video camera 81 with the video encoder 82.

In step S2303 (target detection process), the target detecting unit 21 generates correction data by correcting the first image-captured data, and extracts an image of a target from the correction data. Moreover, the target detecting unit 21 may extract data of an outline, a color, a pattern, a character and the like as features of the target after extracting the image of the target.

In step S2304 (character position information detection process), the target character position information detecting unit 2101 generates IR correction data by correcting the image-captured data shot by the video camera 81, and extracts a character string related to the position of the target from the IR correction data.

Operations in steps S2305 to S2312 are identical to those in steps S2 to S9 of FIG. 7A described in the embodiment 1.

In step S2313 (character position information detection process), the target character position information detecting unit 2101 generates a request notification for obtaining position data corresponding to the character string extracted in step S2304. In step S2314 (character position information detection process), the target character position information detecting unit 2101 outputs the character string (request notification) to the character string recording unit 2204 or the recording unit 5.

Next, the character string recording unit 2204 or the recording unit 5 obtains the character string (included in the request notification) extracted in step S2304, and detects character string data that matches the character string by searching the character string/position data conversion table. Then, the character string recording unit 2204 or the recording unit 5 detects position data corresponding to the character string data from the character string/position data conversion table, and outputs the position data to the target character position information detecting unit 2101.

In step S2313 (character position information detection process), the target character position information detecting unit 2101 obtains the position data.

Operations in steps S2314 to S2319 are identical to those of steps S12 to S15 of FIG. 7B described in the embodiment 1.

As described above, an infrared image capturing device that can shoot a target with an infrared ray is provided separately from an image capturing device, a recording unit records position data in association with position information, position information is detected from the image output from the infrared image capturing device, and position data associated with the position information is detected by referencing the recording unit. As a result, even if a plurality of objects having a shape, a color or a pattern similar to that of a target except for the target, the target can be identified by coating or printing position information on the target.

The above described embodiments 1 to 5 refer to the case where the target is installed upward. However, the target may be installed on a lateral side of a road (at the side, an end or the like). If the target is installed on the lateral side of the road, position data of a position where the target installed on the lateral side disappears from the image may be prerecorded in the recording unit, the target may be tracked after catching the target and position data may be output at the position where the target disappears from the image.

Additionally, as another method, an aspect ratio is calculated based on a horizontal width and a vertical length of a target installed on the lateral side when a mobile unit reaches a predetermined position, and position data corresponding to the aspect ratio is recorded in the recording unit. Then, the target is tracked after being caught, and position data may be output at a position where the aspect ratio of the target in an image reaches the recorded aspect ratio. Preferably, the aspect ratio in the case where the target is installed on the lateral side is calculated with "aspect ratio=(width in X direction/length in Y direction)".

A configuration in a case where these embodiments are implemented as a computer program is described.

Figure 24:
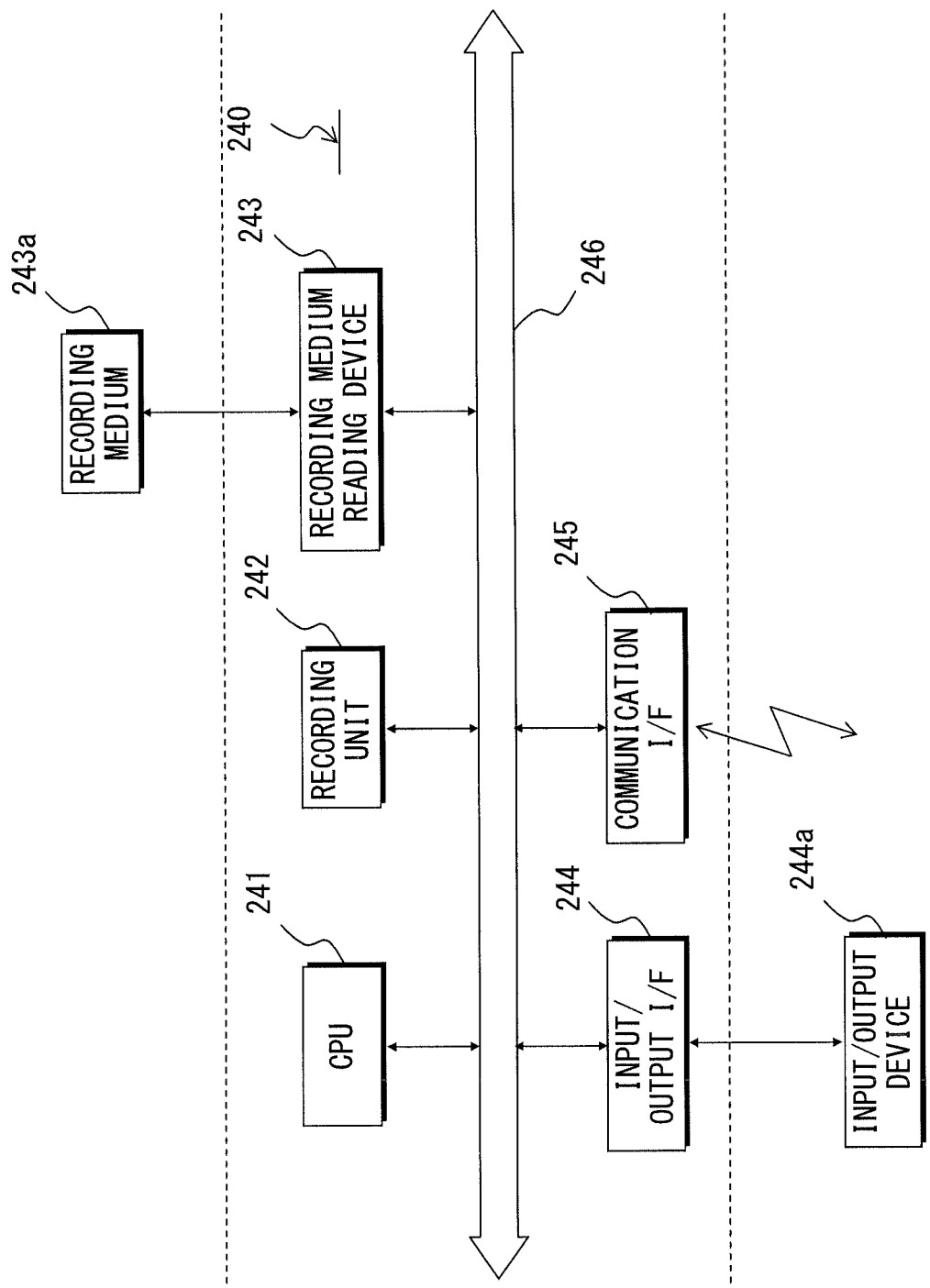
FIG. 24 illustrates one example of a configuration when these embodiments are implemented as a computer program.

FIG. 24 illustrates one example of a hardware configuration of a computer that can implement the apparatuses of the above described embodiments 1 to 5.

Hardware 240 of the computer includes a CPU 241, a recording unit 242 (a ROM, a RAM, a hard disk drive or the like), a recording medium reading device 243, an input/output interface 244 (input/output I/F), a communication interface 245 (communication I/F), and the like. The above described components are interconnected by a bus 246.

The CPU 241 executes processes such as the above described target detection process, target position information conversion process, aspect ratio calculation process, comparison process, position data output process, camera selection process, camera image synthesis process, target pattern detection process, target pattern position information conversion process, character position information detection process, and the like.

In the recording unit 242, a program executed by the CPU 241 and data are recorded. Moreover, the recording unit 242 is used as a working area or the like.

The recording medium reading device 243 controls a data read/write from/to a recording medium 243a according to a control of the CPU 241. Moreover, according to a control of the recording medium reading device 243, written data is stored onto the recording medium 243a or data stored onto the recording medium 243a is read. Examples of the insertable/ejectable recording medium 243a include computer-readable non-transitory recording media such as a magnetic recording device, an optical disc, a magneto-optical recording medium, semiconductor memory and the like. Examples of the magnetic recording device include a hard disk device (HDD) and the like. Examples of the optical disc include a DVD (Digital Versatile Disc), a DVD-RAM (Random Access Memory), a CD-ROM (Compact Disc Read Only Memory), a CD-R (Recordable)/RW (ReWritable) and the like. Examples of the magneto-optical recording medium include an MO (Magneto-optical) disk and the like. Also the storing unit 242 is one type of, a non-transitory recording medium.

To the input/output interface 244, an input/output device 244a (such as a switch, a display and the like of a car navigation system) is connected. The input/output interface 244 receives information input by a user, and transmits the information to the CPU 241 via the bus 246. Moreover, the input/output interface 244 causes a display unit to display operation information and the like on its screen according to an instruction issued from the CPU 241.

The communication interface 245 is an interface for making a LAN connection to another computer, an Internet connection or a wireless connection. Moreover, the communication interface 245 is connected to another device, and controls a data input/output to/from an external device.

By using a computer having such a hardware configuration, the functions of the above described processes (the processes represented by the flowcharts and the like) described in the embodiments 1 to 5) are implemented. In this case, a program that describes contents of the processes of the functions to be possessed by the system is provided. The computer executes the program, whereby the above functions of the processes are implemented in the computer. The program that describes the contents of the processes can be recorded onto the computer-readable recording medium 243a.

If the program is distributed, for example, a portable recording medium such as a DVD, a CD-ROM or the like on which the program is recorded is marketed. Alternatively, the program can be stored in a storage device of a server computer, which can transfer the program to another computer.

The computer that executes the program stores, for example, the program recorded onto the portable recording medium or the program transferred from the server computer in its storage device. Then, the computer reads the program from its storage device, and executes the processes according to the program. Note that the computer can directly read the program from the portable recording medium, and can execute the processes according to the program. Alternatively, the computer can execute the processes according to a received program each time the program is transferred from the server computer.

The image capturing device referred to in the above described embodiments 1 to 5 or the like may be installed to a mechanism that is provided in a mobile unit and can change a shooting range so as to automatically track a target.

Furthermore, the present invention is not limited to the above described embodiments 1 to 5 and the like. The present invention can be improved and modified within a scope that does not depart from the gist of the present invention. Moreover, the embodiments can be combined within a scope that does not cause any inconsistency among the processes.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment (s) of the present inventions has (have) been described in detail, it should be understood that the various changes, substitutions, and alterations could be made hereto without departing from the spirit and scope of the invention.

What is claimed is:
1. A mobile unit position detecting apparatus, comprising:
an image capturing device for sequentially or intermittently shooting, with the image capturing device, a target installed in a vicinity of a route on which a mobile unit can move, and for detecting a position of the mobile unit based on the target in a shot image;
target position extracting unit configured to identify image data that matches image data of the target in the image from among image data of a plurality of targets by making a comparison between the image data of the plurality of targets and the image data of the target, which are recorded in a recording unit, and the image data of the target in the image, and to obtain position data that is recorded in the recording unit, is associated with the identified image data and indicates a position when the mobile unit approaches the target at a predetermined distance;
target position outputting unit configured to output the position data if determining whetherthat the target in the image changes to a shape, recorded in the recording unit, of the target in the image when the mobile unit approaches the target at the predetermined distance;
the recording unit configured to record a target ID, assigned to the target, for identifying the target, target setting data including the image data of the target shot in advance for each target in association with the target ID, a threshold value obtained by calculating an aspect ratio based on the shape of the target in the image when the mobile unit approaches the target at the predetermined distance, and position data, that indicates a position for which the threshold value is calculated, wherein:
the target position extracting unit comprises
a target detecting unit configured to generate target data by extracting the target from the image shot by the image capturing device, to extract from the recording unit target setting data that best matches the target data, and to obtain a target ID corresponding to the extracted target setting data, and
a target position information converting unit configured to detect the position data associated with the target ID from the recording unit after obtaining the target ID obtained by the target detecting unit; and
the target position outputting unit comprises
an aspect ratio calculating unit configured to track the target in the image shot by the image capturing device, and to calculate an aspect ratio of the target being tracked in the image,
a comparing unit configured to output an enable signal if the aspect ratio is equal to or lower than the threshold value, and an FF unit configured to obtain position data from the target position information converting unit, to output the position data upon receipt of the enable signal and to update a current position of the mobile unit based on the position data.

2. The mobile unit position detecting apparatus according to claim 1, further comprising
an infrared image capturing device that can shoot an image of the target with an infrared ray, separately from the image capturing device, wherein:
the recording unit comprises a table for the infrared image capturing device, in which target setting data including the image data of the target, which is shot by the infrared image capturing device in advance for each target, the position data and the threshold value are recorded in association with the target ID;
a camera selecting unit configured to make a comparison between brightness levels of images shot by the image capturing device and the infrared image capturing device, and to select an image capturing device having a higher brightness level is comprised;
a camera switching unit configured to output, to the target detecting unit, image-captured data that is shot by the image capturing device selected by the camera selecting unit is comprised; and
if the infrared image capturing device is selected, the target detecting unit obtains the target ID by using the table for the infrared image capturing device, and the target position information converting unit obtains the position data by using the table for the infrared image-capturing device.

3. The mobile unit position detecting apparatus according to claim 1, further comprising
a second image capturing device for shooting a shooting range that is different from a shooting range of the image capturing device and is common to the shooting range of the image capturing device, separately from the image capturing device, wherein
a synthesis image is generated by synthesizing image-captured data shot by the image capturing device and the second image capturing device so that common shooting ranges overlap, and the synthesis image is output to the target detecting unit.

4. The mobile unit position detecting apparatus according to claim 1, wherein
a pattern in which target IDs are recorded in an order of catching the targets is set in the recording unit, and only a target ID corresponding to a target caught last in the pattern is associated with the position data,
a target pattern detecting unit configured to obtain the target ID corresponding to the target caught last in the pattern when the target pattern is detected is comprised, and
a target pattern position information converting unit configured to obtain the target ID obtained by the target pattern detecting unit, to detect from the recording unit the position data associated with the target ID corresponding to the target caught last, and to output the position data to the FF unit.

5. The mobile unit position detecting apparatus according to claim 1, further comprising
an infrared image capturing device that can shoot an image of the target with an infrared ray, separately from the image capturing device, wherein:
the recording unit records the position data in association with position information about a position of the target; and
a target character position information detecting unit configured to detect position information from an image output from the infrared image capturing device, to detect the position data associated with the position information by referencing the recording unit, and to output the position data to the FF unit is comprised.

6. A mobile unit position detecting method, being executed by, a computer, of sequentially or intermittently shooting, with an image capturing device, a target installed in a vicinity of a route on which a mobile unit can move, and of detecting a position of the mobile unit based on the target in a shot image, the computer including
recording by a recording unit in the computer a target ID, assigned to the target, for identifying a target, and further recording, in association with the target ID, target setting data including image data of the target shot in advance for each target, a threshold value obtained by calculating an aspect ratio based on a shape of the target in the image when the mobile unit approaches the target at a predetermined distance, and position data that indicates a position for which the threshold value is calculated,
causing the computer:
to generate target data by extracting, from the recording unit, the target from an image shot by the image capturing device, for extracting target setting data that best matches the target data, and for obtaining a target ID corresponding to the extracted target setting data,
to detect the position data associated with the target ID obtained from the recording unit,
to track the target in the image shot by the image capturing device, calculating an aspect ratio of the target being tracked in the image, outputting the position data if the aspect ratio is equal to or lower than the threshold value, and
to update a current position of the mobile unit based on the position data.

7. The mobile unit position detecting method according to claim 6, wherein:
the recording unit comprises a table for a infrared image capturing device provided separately from the image capturing device, to shoot an image of the target with an infrared ray and to record in association with the target ID, target setting data including image data of the target, which is shot by the infrared image capturing device in advance for each target, the position data and the threshold value,
the mobile unit position detecting method further comprising: causing the computer
to make a comparison between brightness levels of images shot by the image capturing device and the infrared image capturing device, for selecting an image capturing device having a higher brightness level, and for switching to image-captured data shot by the selected image capturing device, and
to obtain the target ID and the position data by using the table for the infrared image capturing device if the infrared image capturing device is selected.

8. The mobile unit position detecting method according to claim 6, wherein:
a second image capturing device for shooting a shooting range that is different from a shooting range of the image capturing device and is common to the shooting range of the image capturing device is comprised separately from the image capturing device,
the mobile unit position detecting method further comprising: causing the computer to generate a synthesis image by synthesizing image-captured data shot by the image capturing device and the second image capturing device so that common shooting ranges overlap.

9. The mobile unit position detecting method according to claim 6, wherein:
a pattern in which target IDs are recorded in an order of catching the targets is set in the recording unit, and only a target ID corresponding to a target caught last in the pattern is associated with the position data,
the mobile unit position detecting method further comprising: causing the computer
to obtain the target ID corresponding to the target caught last in the pattern when the target pattern is detected, and
to detect from the recording unit the position data associated with the target ID corresponding to the target caught last.

10. The mobile unit position detecting method according to claim 6, wherein:
the recording unit records the position data in association with position information about a position of the target,
the mobile unit position detecting method further comprising: causing the computer
to detect position information from an image output from the infrared image capturing device, and for detecting the position data associated with the position information by referencing the recording unit.

* * * * *

UNITED STATES PATENT AND TRADEMARK OFFICE
CERTIFICATE OF CORRECTION

PATENT NO. : 8,811,746 B2
APPLICATION NO. : 13/351609
DATED : August 19, 2014
INVENTOR(S) : Kensuke Sawada Page 1 of 1

It is certified that error appears in the above-identified patent and that said Letters Patent is hereby corrected as shown below:

In the Claims

Column 24, Line 36, In Claim 1, delete "whetherthat" and insert -- whether that --, therefor.

Column 24, Line 47, In Claim 1, delete "data," and insert -- data --, therefor.

Column 26, Line 8, In Claim 6, delete "by," and insert -- by --, therefor.

Signed and Sealed this
First Day of September, 2015

Michelle K. Lee
*Director of the United States Patent and Trademark Office*